(12) United States Patent
Jenkins et al.

(10) Patent No.: US 10,896,469 B1
(45) Date of Patent: Jan. 19, 2021

(54) AUTOMATED CALLER IDENTIFICATION FOR IMPROVED WORKFLOW EFFICIENCY FOR INSURANCE CLAIM ASSOCIATES

(71) Applicant: STATE FARM MUTUAL AUTOMOBILE INSURANCE COMPANY, Bloomington, IL (US)

(72) Inventors: John H. Jenkins, Bloomington, IL (US); Andrew J. Feit, Normal, IL (US); Christina M. Boring, Bloomington, IL (US); Chadd Eugene Grove, Bloomington, IL (US); Brent D. Hellewell, Bloomington, IL (US); Beth Craig, Bloomington, IL (US); Kevin Stuepfert, Bloomington, IL (US); Robert S. Loy, Bloomington, IL (US); Scott M. Wirtjes, Tremont, IL (US); Scott E. Lackey, Bloomington, IL (US); Manuela Holt, Heyworth, IL (US); David Kuriyan Schuster, Bloomington, IL (US); Jeremy M. Miller, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 927 days.

(21) Appl. No.: 14/881,468

(22) Filed: Oct. 13, 2015

Related U.S. Application Data

(60) Provisional application No. 62/129,151, filed on Mar. 6, 2015, provisional application No. 62/090,520, filed on Dec. 11, 2014.

(51) Int. Cl.
*G06Q 40/00* (2012.01)
*G06Q 40/08* (2012.01)
*G06Q 30/00* (2012.01)

(52) U.S. Cl.
CPC ......... *G06Q 40/08* (2013.01); *G06Q 30/016* (2013.01)

(58) Field of Classification Search
USPC ....... 705/4, 5, 2, 3, 26.4; 709/203, 224, 217, 709/218, 226, 227; 463/25; 446/268;
(Continued)

(56) References Cited

U.S. PATENT DOCUMENTS

| | | | | |
|---|---|---|---|---|
| 6,166,729 A | * | 12/2000 | Acosta | H04N 5/232 715/719 |
| 7,406,427 B1 | * | 7/2008 | Guyan | G06Q 40/08 705/4 |

(Continued)

OTHER PUBLICATIONS

The Exploration for Using E-commerce Platform to Optimize Insurance Business; 2012 International Conference on Management of e-Commerce and e-Government (pp. 191-196); Erhao Zhong, Cuncong Zhong, Huijuan Yang; Oct. 1, 2012. (Year: 2012).*

(Continued)

*Primary Examiner* — Tien C Nguyen
(74) *Attorney, Agent, or Firm* — Marshall, Gerstein & Borun LLP

(57) ABSTRACT

In a computer-implemented method for facilitating handling, by a user of a computing device having one or more display screens, of a call from an insurance customer regarding a loss event, a caller identification system may be accessed by one or more servers to determine a phone number associated with the call from the insurance customer. The phone number may be used to automatically retrieve customer information associated with the insurance customer from one or more databases of an insurance provider. The customer information may include a name of the insurance customer and/or a policy number of an insurance policy of the insurance customer. A customer overview, (Continued)

including the retrieved name and/or the retrieved policy number, may be displayed to the user on the one or more display screens.

22 Claims, 19 Drawing Sheets

(58) Field of Classification Search
USPC ............ 700/236, 245; 706/25, 45; 318/611; 606/130; 715/708, 704; 235/375, 380, 235/379, 451; 340/540; 235/383; 719/328, 315; 717/108; 726/9
See application file for complete search history.

(56) References Cited

U.S. PATENT DOCUMENTS

| | | | |
|---|---|---|---|
| 7,430,514 B1* | 9/2008 | Childress | G06Q 40/08 705/4 |
| 7,480,715 B1* | 1/2009 | Barker | H04L 41/147 709/223 |
| 7,689,442 B2* | 3/2010 | Childress | G06Q 40/08 705/4 |
| 7,809,587 B2* | 10/2010 | Dorai | G06Q 40/08 705/4 |
| 7,889,931 B2* | 2/2011 | Webb | G01N 21/8806 382/209 |
| 7,953,615 B2* | 5/2011 | Aquila | G06Q 10/10 705/4 |
| 8,239,220 B2* | 8/2012 | Kidd | G01M 17/0078 705/4 |
| 8,265,963 B1* | 9/2012 | Hanson | G06Q 40/08 705/4 |
| 8,346,578 B1* | 1/2013 | Hopkins, III | G06Q 30/02 705/4 |
| 8,364,505 B1 | 1/2013 | Kane et al. | |
| 8,374,957 B1* | 2/2013 | Garcia | G06Q 20/4037 705/39 |
| 8,527,305 B1* | 9/2013 | Hanson | G06Q 10/10 705/4 |
| 8,537,338 B1* | 9/2013 | Medasani | G01C 21/32 356/4.01 |
| 8,543,486 B2* | 9/2013 | Donoho | G06Q 40/00 705/37 |
| 8,630,820 B2* | 1/2014 | Amis | G01S 19/16 702/186 |
| 8,799,034 B1* | 8/2014 | Brandmaier | G06Q 40/08 705/4 |
| 2002/0007225 A1* | 1/2002 | Costello | G06Q 30/02 700/99 |
| 2002/0055861 A1* | 5/2002 | King | G06Q 40/08 705/4 |
| 2003/0154111 A1* | 8/2003 | Dutra | G06Q 30/0283 705/4 |
| 2004/0088198 A1* | 5/2004 | Childress | G06Q 40/08 705/4 |
| 2004/0243423 A1* | 12/2004 | Rix | G06Q 10/10 705/400 |
| 2005/0080649 A1* | 4/2005 | Alvarez | G06Q 10/1057 705/4 |
| 2007/0214021 A1 | 9/2007 | McLaughlin | |
| 2007/0226017 A1 | 9/2007 | Gross et al. | |
| 2008/0091490 A1* | 4/2008 | Abrahams | G06Q 10/06375 705/7.28 |
| 2008/0255887 A1* | 10/2008 | Gruter | G06Q 40/08 705/4 |
| 2009/0002364 A1* | 1/2009 | Witte, II | G06K 9/00208 345/419 |
| 2009/0027253 A1* | 1/2009 | van Tooren | G08G 5/045 342/29 |
| 2009/0055226 A1* | 2/2009 | Tritz | G06Q 30/0283 705/4 |
| 2009/0265193 A1* | 10/2009 | Collins | G06Q 30/0185 705/4 |
| 2010/0250022 A1* | 9/2010 | Hines | G05D 1/0094 701/2 |
| 2010/0302359 A1* | 12/2010 | Adams | B64C 39/024 348/117 |
| 2011/0137443 A1* | 6/2011 | Farahani | G06F 30/20 700/98 |
| 2011/0161118 A1* | 6/2011 | Borden | G16H 10/60 705/4 |
| 2012/0033821 A1* | 2/2012 | Ohta | G10K 11/17883 381/71.1 |
| 2012/0071998 A1* | 3/2012 | Davies | G06K 9/00214 700/98 |
| 2012/0140041 A1* | 6/2012 | Burgunder | G06T 7/001 348/46 |
| 2012/0210853 A1* | 8/2012 | Abershitz | F41H 11/00 89/1.11 |
| 2012/0250010 A1* | 10/2012 | Hannay | G01N 21/952 356/237.1 |
| 2012/0303336 A1* | 11/2012 | Becker | G01B 11/03 703/1 |
| 2013/0226624 A1* | 8/2013 | Blessman | H04N 7/183 705/4 |
| 2014/0163852 A1* | 6/2014 | Borri | G08G 5/0026 701/120 |
| 2014/0244078 A1* | 8/2014 | Downey | G06F 21/44 701/11 |
| 2015/0073834 A1 | 3/2015 | Gurenko et al. | |
| 2015/0127388 A1 | 5/2015 | Oldham | |
| 2015/0324924 A1 | 11/2015 | Wilson et al. | |
| 2016/0189303 A1* | 6/2016 | Fuchs | G06Q 40/08 705/4 |

OTHER PUBLICATIONS

Enhancing e-CRM in the insurance industry by mobile e-services; 2005 IEEE International Conference on e-Technology, e-Commerce and e-Service (pp. 235-239); F. Bodendorf, A. Schobert; Jan. 1, 2005. (Year: 2005).*

* cited by examiner

Call In Progress...

Call from: — 202
555-555-5555
Please ask the caller to verify their name, current address or policy number, and the reason for their call. — 204

Policyholders on Account: — 206

- 210a ☑ Sofia Smith
- 210b ☐ Patti Smith

Policies: — 208

- 212a ☐ 12-HL-4322-9  🏠 Home: 732 S Clark St, Chicago, IL 60605
- 212b ☐ 12-EL-4135-9  🚗 Auto: 2012 Tesla S: ACH 000
- 212c ☑ 12-EL-4135-8  🚗 Auto: 2009 Toyota Camry

CANCEL — 216

APPLY — 214

| Claim Associate Resources ☐ | | |
|---|---|---|
| Call mode | 01:45 | Call In Progress (555-555-5555) | Search 🔍 |

*300*

Type
Auto ▶  🗑 Delete

Location
Illinois ▶  🗑 Delete

+Add filter

Claim Follow Up ☆

1. This is where the Claims associate shows empathy and gets the conversation going.

2. Questions are asked, the length and nature of the call is discussed.

3. The basic questions are divided into four categories of Who, What, When, And Where.

‹ Word Track Index

[ Search Word Tracks ]

---

Overview

Personal Info   Edit Policyholder Info
Policyholder Phone Number  DOB      Email                Address
Sofia Smith   555-555-5555  10/4/1954  sofia@email.com  732 S.Clark St
                                                        Chicago, IL 60605

⚠ Verify with the policyholder that this contact info is current

Claim History
⊟ Open Claims ← 302

306A        *Claim Number*   *Type:*   *Created on:*   *Assigned to:*
   ↘ 12-3D45-678    Auto     02/10/2014       Jake Roberts
306B
   ↘ 14-3F46-222    Fire     07/23/2010       Doug Evans ⊞ Closed Claims ← 304

Family Members
⊕ Pat Smith              Spouse       10/13/1953
- - - - - - - - - - - - - - - - - - - - - - - - - - - - - - - - -
⊕ Pat Smith Jr.          Son *(minor)*  ⚠ Birthday is today

Policies
🚗 2009 Toyota Camry     12-EL-4135-8    Listed Driver: Sofia Smith

Claim Associate Resources ☐

Call mode

Type
▶ Auto    🗑 Delete

Location
▶ Illinois    🗑 Delete

+Add filter

Claim Follow Up ☆

1. This is where the Claims associate shows empathy and gets the conversation going.

2. Questions are asked, the length and nature of the call is discussed.

3. The basic questions are divided into four categories of Who, What, When, And Where.

‹ Word Track Index

[ Search Word Tracks ]

---

Search 🔍

— 310

01:45    Call In Progress (555-555-5555)

Overview

⚠ Auto claim 12-3D45-678 is currently open. View policyholder claim page — 312

⊕ View Coverages

🚗 2012 Tesla S: ACH 000
⊕ View Coverages    12-EL-4135-9    Listed Driver: Pat Smith ✉ 732 S.Clark St
Chicago, IL 60605
⊕ View Coverages    12-EL-4135-6    Listed Owner: Pat Smith

*Recent Interaction History*
+ Online Activity
+ Messages
+ Phone Calls:

FIG. 10

LEFT MONITOR (330)

ILR Resources

Call mode: 01:33 — Waiting For Call...

Overview

*Personal Info* — Edit Policyholder Info
Policyholder: Sofia Smith  Phone Number: 555-555-5555  DOB: 10/4/1954  Email: *Not on file*  Address: 732 S. Clark St, Chicago, IL 60605

View all notes    + New note

SF Notepad

Notes

Choose Template: Loss Report ▶

What happened:
She was driving through an intersection at Benton and Elston in Joliet, IL. She was hit by another vehicle on the front left corner of her car and pushed into a light pole, breaking the light pole.

→ When: February 10th 2014  (334)

Parties Involved:
Linda Johnson

Type
Auto ▶  🗑 Delete

Location
Illinois ▶  🗑 Delete

+ Add filter

Capture Loss Report

✓ 1. This is whom the ILR Associate shows empathy and gets the conversation going.

✓ 2. Questions are asked, the length and nature of the call is discussed.

✓ 3. The basics questions are divided into four categories of Who, What, When, and Where.

Word Track Index

Search Word Tracks 🔍

---

RIGHT MONITOR

Loss Reporting Tool

Setup | Loss Info | Claim | Fire Clai...

Auto Claim

Loss Overview

Type
● Collision
◎ Comprehensive

Front End Collision ▶  📅 ← 332

Date of Loss
Feb 10, 2014

Time of Loss
2:00  PM ▶

Is your car driveable
✓
✗

AUTOMATED CALLER IDENTIFICATION FOR IMPROVED WORKFLOW EFFICIENCY FOR INSURANCE CLAIM ASSOCIATES

CROSS-REFERENCE TO RELATED APPLICATIONS

This claims the benefit of U.S. Patent Application No. 62/090,520, filed on Dec. 11, 2014 and entitled "Integrated Tool Providing Improved Workflow Efficiency for Insurance Claim Associates," and U.S. Patent Application No. 62/129,151, filed on Mar. 6, 2015 and entitled "Automated Caller Identification for Improved Workflow Efficiency for Insurance Claim Associates," the disclosures of which are hereby incorporated herein by reference in their entireties.

FIELD OF THE DISCLOSURE

The present disclosure generally relates to insurance and, more specifically, to claim handling and/or other insurance-related tasks.

BACKGROUND

Insurance claim associates are often subject to significant cognitive demands when handling customer calls regarding accidents or other loss events. For example, claim associates typically use numerous software applications/packages, with multiple windows open at the same time on one or more monitor screens, when performing daily tasks such as entering loss report information or providing claim status updates to customers. Conversing with the customer, and collecting and/or entering the necessary information about the customer and the loss event, may be difficult, particularly when managing these numerous applications/windows. As a result, the claim associate may need to ask the customer to repeat information, which may cause delays and/or customer frustration, and/or the associate may be more prone to making data entry errors.

BRIEF SUMMARY

The present embodiments may, inter alia, provide claim associates or other users (e.g., other insurance provider employees) with a tool that automatically identifies a caller, retrieves information about the caller, and uses the retrieved information to present caller summary information and/or to pre-populate one or more loss reporting fields provided by a loss reporting/intake tool. As a result, the time required to handle a customer call and/or enter a loss report, and/or the risk of data entry errors, may be reduced, ultimately leading to increased customer satisfaction.

In one aspect, a computer-implemented method for facilitating handling, by a user of a computing device having one or more display screens, of a call from an insurance customer regarding a loss event may include (1) accessing, by one or more servers, a caller identification system to determine a phone number associated with the call from the insurance customer. The method may also include (2) automatically retrieving, by the one or more servers and using the determined phone number, customer information associated with the insurance customer from one or more databases of an insurance provider, the customer information including (i) a name of the insurance customer and/or (ii) a policy number of an insurance policy of the insurance customer. The method may also include (3) displaying, to the user on the one or more display screens, a customer overview including (i) the retrieved name and/or (ii) the retrieved policy number such that claim handling and/or loss reporting is enhanced. The method may include additional, less, or alternate functionality, including that discussed elsewhere herein.

In another aspect, a computing system for facilitating handling of insurance-related calls may include one or more databases collectively storing policy and policyholder records of an insurance provider, one or more processors, and a non-transitory memory. The memory may store instructions that, when executed by the one or more processors, cause the one or more processors to access a caller identification system to determine a phone number associated with a call (i) from an insurance customer and (ii) handled by a user of a computing device. The instructions may also cause the processor(s) to automatically retrieve, using the determined phone number, customer information associated with the insurance customer from the one or more databases. The customer information may include (i) a name of the insurance customer and (ii) a policy number of an insurance policy of the insurance customer. The instructions may also cause the processor(s) to display, on the one or more display screens, a customer overview including (i) the retrieved name and/or (ii) the retrieved policy number to facilitate enhanced insurance claim and/or loss reporting. The system may include additional, less, or alternate functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

FIG. 3 depicts an exemplary user interface display that provides, and requests confirmation of, information about a caller, according to one embodiment.

FIGS. 5-8 depict exemplary user interface displays that may be presented within the display arrangement of FIG. 4, according to one embodiment.

FIG. 10 depicts an exemplary display arrangement in which a claim associate has entered notes during a customer call, according to one embodiment.

DETAILED DESCRIPTION

Figure 1:
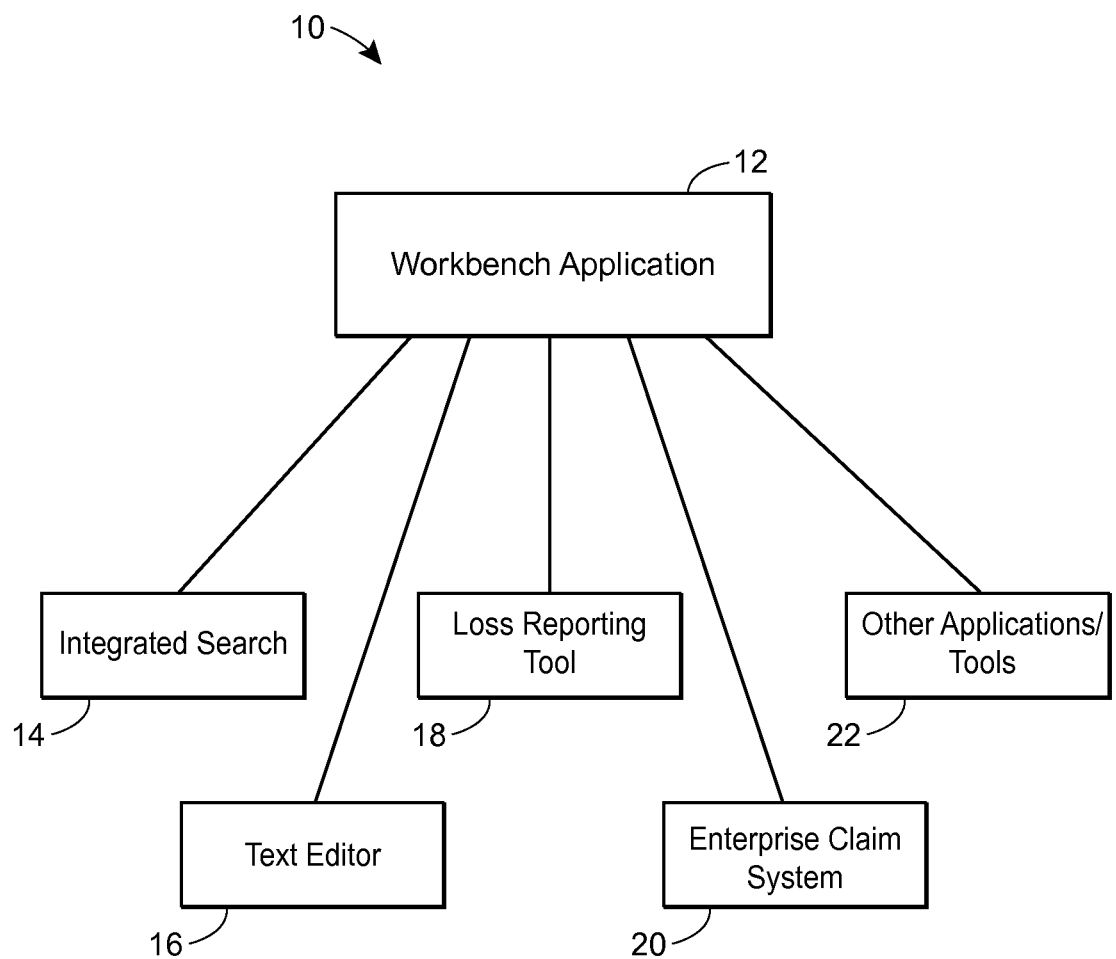
FIG. 1 depicts an exemplary platform in which an integrated tool may improve workflow efficiency for claim associates, according to one embodiment.

I. Exemplary Integrated Tool that Improves Workflow Efficiency for Claim Associates The present embodiments relate to, inter alia, the provision, operation and/or use of an integrated tool that enables claim associates (and/or users) to more efficiently perform their daily tasks, such as loss reporting/intake and/or other claim-related activities. The integrated tool may be used for any type or types of insurance, such as automobile or other vehicle insurance, fire/home insurance or personal property insurance, for example. While the integrated tool may, in some embodiments and/or scenarios, be used by an individual other than a claim associate, for ease of explanation the description that follows primarily refers to users as claim associates.

In some embodiments, the tool integrates/links commonly-used applications into a single user interface (UI) for a claim associate. Each application linked to the integrated tool may be automatically opened at startup of the integrated tool (e.g., when the claim associate logs in at a workstation) and made ready for immediate use by the associate, or may be available to the associate via a launch shortcut in an integrated tool area, for example. Thus, the claim associate may not need to separately seek out each application, open each application, and position the window(s) corresponding to each application on the monitor screen(s) when preparing for the day's business or during the course of a call.

The integrated tool may provide customer overview functionality, which may help the claim associate quickly gain familiarity with the customer and his or her situation. When a customer calls the insurance provider, for example, the customer's phone number may be determined using a "caller ID" feature, and used to access the customer's account/information. For example, the phone number may be used to search one or more internal databases and/or systems/applications to retrieve various kinds of customer information, such as information about the customer himself/herself (e.g., name, home address, email address, etc.), the customer's policy or policies with the insurance provider, the agent(s) of the customer, the family members of the customer, the customer's recent interactions with the insurance provider (e.g., by telephone, email, Internet, an online claim service, etc.), the claim history of the customer, etc. The information may then be displayed within the customer overview to provide the claim associate an "at a glance" view/understanding of the customer. Moreover, information displayed in the customer overview may be linked to the corresponding content (e.g., the claims associate may be able to click on a displayed customer policy to link to more detailed information about that policy, a displayed open or closed claim to link to more detailed information about that claim, etc.). The configuration of the customer overview, and/or the information contained therein, may be dependent upon the user's role/function (e.g., claim associate, underwriting, etc.), or may be fixed.

In addition to integrating multiple, and possibly many, applications for the claim associate, the integrated tool may provide integrated search functionality. For example, search options that have conventionally been provided by multiple applications to search internal or external databases or other sources (e.g., internal policy records, Internet searches, etc.) may be combined in one common interface. Moreover, search results may be integrated with (e.g., used to automatically populate fields in) one or more applications, either automatically or based upon user input. For example, an interactive control may enable the claim associate to specify the relation of a particular person, from among a list of people in a set of search results, to a loss event being reported. The specified relation may then be used by the integrated tool to automatically populate one or more fields provided by a loss intake tool.

The integrated tool may also provide a "smart notepad" text editor application that recognizes data/information entered by the claim associate and categorizes that data/information for direct entry into one or more companion programs/applications. For example, the word "Ford" may be automatically recognized as a vehicle make and used to populate a vehicle make field of a loss intake tool or other application(s). As another example, the words "108th and Madison" may be recognized as a street intersection and used to populate a location field of a loss intake tool or other application(s).

By using one or more of the techniques described above, claim associates or other insurance provider employees may more efficiently enter information, and/or more efficiently find information, while performing common tasks (e.g., entering information for loss reports while speaking to customers, handling calls from customers to check on the status of claims, etc.). As a result, both claim associates and customers may experience fewer delays and less frustration. Moreover, claim associates may be less likely to make errors during data entry (e.g., when using a loss reporting tool).

II. Exemplary Platform for Integrating Multiple Applications

FIG. 1 depicts an exemplary platform 10 in which an integrated tool may improve workflow efficiency for claim associates, according to one embodiment. In the example platform 10, the integrated tool may comprise a workbench application 12 that may link to, and provide a common user interface for, a number of different tools/applications. The linked tools/applications may include an integrated search tool 14, a text editor application 16, a loss reporting (or "loss intake") tool 18, an enterprise claim system 20 and/or one or more other applications/tools 22 (e.g., an enterprise customer information system that manages customer information, a mapping application, etc.).

Generally, the integrated search tool 14 may search across multiple internal databases for policy information, customer information, claim information and/or other information. The integrated search tool 14 may also search one or more external sources, such as an Internet search (e.g., by accessing a third party web-based search engine) or a search of an external map/geographic database (e.g., by accessing a third party web-based mapping application), etc. The integrated search tool 14 may enable the claim associate to select different modes of searching, such as a search mode to search for policyholders and their associated policy information, a search mode to search the Internet for service providers (e.g., body shops, tow yards, medical providers, etc.), and/or a search mode to search the Internet and/or external databases for geographic/map information. In some embodiments, the functionality of the integrated search tool 14 may be at least partially incorporated into the workbench application 12 itself, rather than residing in a distinct software package in communication with the workbench application 12.

The text editor application 16 may enable the claim associate to enter free-form notes while speaking with a customer. As discussed further below, the workbench application 12 may be configured to recognize keywords (e.g., words or phrases) entered using the text editor application 16, and to take various actions in response (e.g., auto-population of fields). In some embodiments, the functionality of the text editor application 16 may be incorporated into the workbench application 12 itself, rather than a distinct software package (e.g., Microsoft Notepad) in communication with the workbench application 12.

The loss reporting/intake tool 18 may generally enable the claim associate to enter information relating to a potential claim (e.g., a customer's accident description provided during a phone call), and may transfer at least some of the entered information to the enterprise claim system 20 for claim setup (e.g., as information is entered, or after the associate selects a virtual "submit" button, etc.). The workbench application 12 may also enable the claim associate to access the enterprise claim system 20 directly to view and/or modify information for an open claim.

In other embodiments, the workbench application 12 may be linked to, and provide a common user interface for, more, fewer and/or different applications/tools than those shown in FIG. 1. If the platform 10 is used for underwriting, for example, the linked applications/tools may include other applications for viewing and/or updating policy information, rating information, etc. Moreover, in some embodiments, the set of tools/applications available to the user may depend on the role and/or identity of the user. For example, a user may log into the workbench application 12 by providing a user identifier, and the user identifier may be used to identify the user's job function (e.g., claim associate) and select the appropriate set of linked tools/applications (e.g., a first set for automobile claim handlers, a second set for fire/home claim handlers, a third set for underwriting employees, etc.).

Further detail about the provision, operation and use of the platform 10 is provided below, according to various embodiments.

Figure 2:
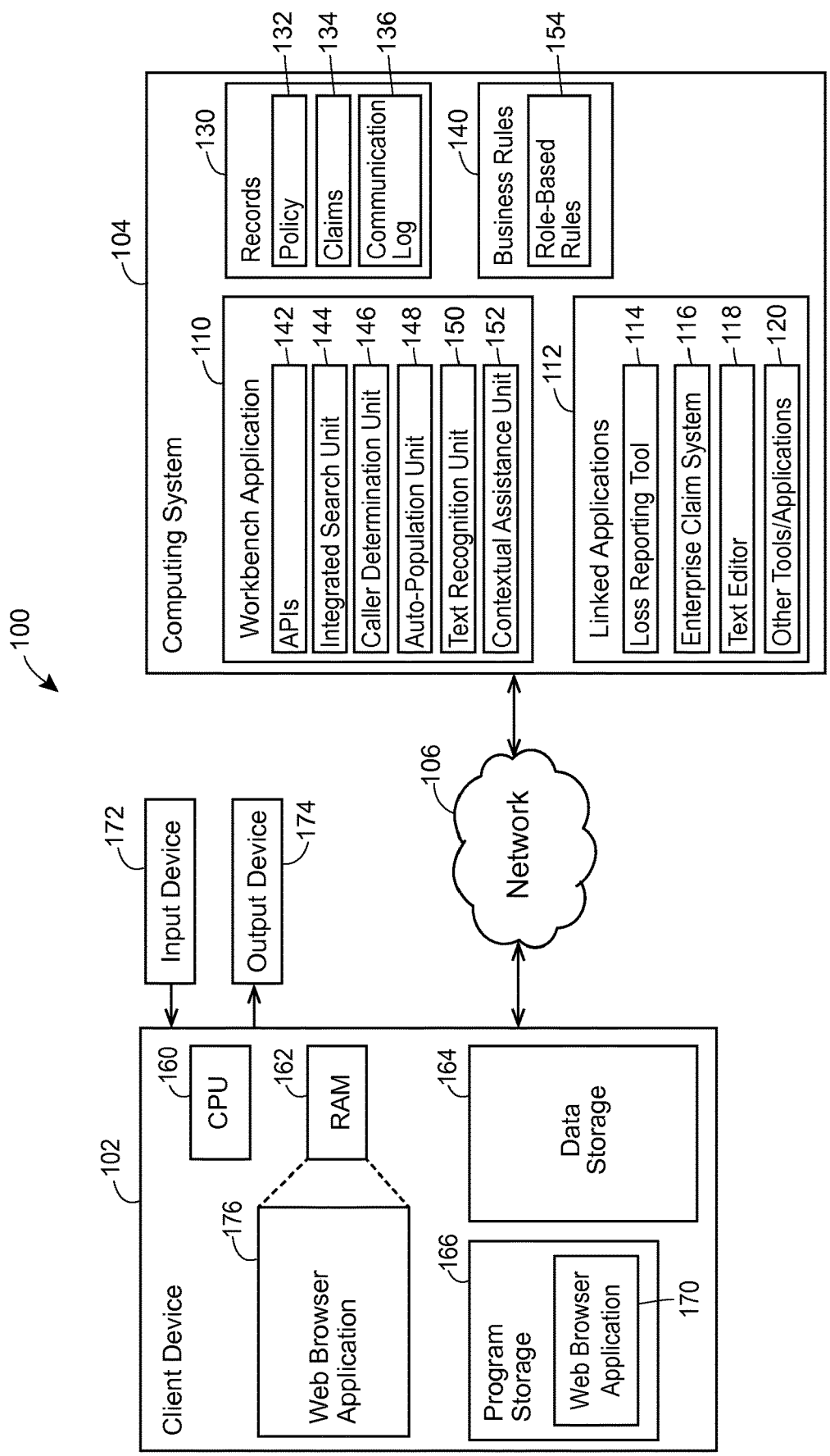
FIG. 2 depicts an exemplary environment including components associated with the provision, operation and use of an integrated tool that may improve workflow efficiency for claim associates, according to one embodiment.

III. Exemplary Environment for the Provision, Operation and/or Use of an Integrated Tool that Improves Workflow Efficiency for Claim Associates FIG. 2 depicts an exemplary environment 100 including components associated with the provision, operation and use of an integrated tool that may improve workflow efficiency for claim associates, according to one embodiment. As illustrated in FIG. 2, the environment 100 may include a client device 102 and a computing system 104. The computing system 104 may include one or more servers of an insurance provider, such as a home/fire and/or automobile insurance company, for example. The user of the client device 102 may be an employee of the insurance provider (e.g., a claim associate/handler), for example. In the exemplary environment 100, the computing system 104 may be communicatively coupled to the client device 102 via a network 106. The network 106 may be a single communication network, or may include multiple communication networks of one or more types (e.g., one or more wired and/or wireless local area networks (LANs), and/or one or more wired and/or wireless wide area networks (WANs) such as the Internet).

The computing system 104 may include one or more persistent memories, which may store a workbench application 110 and a number of linked applications 112. As discussed above in connection with the platform 10 of FIG. 1, the linked applications 112 may include a number of different applications, such as a loss reporting tool 114 (e.g., similar to loss reporting tool 18 of FIG. 1), an enterprise claim system 116 (e.g., similar to enterprise claim system 20 of FIG. 1) and/or a text editor tool 118 (e.g., similar to text editor tool 16 of FIG. 1), for example. The linked applications 112 may also include one or more other tools/applications 120, such as an enterprise customer information system, a mapping application, etc., and may include third party applications and/or applications developed by the insurance provider. In other embodiments, the linked applications 112 may include fewer and/or different applications than those shown in FIG. 2.

The workbench application 110 (e.g., an application similar to the workbench application 12 of FIG. 1) may include instructions of one or more web pages (e.g., HyperText Markup Language (HTML) instructions, JavaScript instructions, JavaServer Pages (JSP) instructions, and/or any other type of instructions suitable for defining the content and presentation of the web page(s)), and/or may include instructions of a plug-in, extension and/or stand-alone software component that may be downloaded by the client device 102 from the computing system 104, for example.

Generally, the workbench application 110 may provide claim associates with a user interface that enables the associates to access the linked applications 112 (e.g., by providing user-selectable links/shortcuts to one or more of the linked applications 112, and/or by displaying the user interface(s) of one or more of the linked applications 112 within, or otherwise in conjunction with, the user interface of the workbench application 110). The user interface provided by the workbench application 110 may be displayed entirely within a single window and/or monitor screen, or may be distributed across multiple windows and/or multiple monitor screens. In some embodiments, the particular set of linked applications 112 that is accessible via the workbench application 110 depends on the user and/or the user's role with the insurance provider. When a user logs in to the workbench application 110, for example, the workbench application 110 may process the user's identifier (e.g., login name, password, etc.), and the appropriate set of linked applications 112 may be made available via the user interface of the workbench application 110. The particular applications shown within linked applications 112 of FIG. 2 may correspond to a scenario in which the workbench application 110 has identified the user as a claim associate, for example.

The persistent memory or memories of the computing system 104 may also store records 130, including policy records 132 containing information on customer policies (e.g., policy numbers, policyholder names and other information, coverages, limits, deductibles, etc.), claims records 134 containing information on open and/or closed customer claims, and a communication log 136 containing information relating to past customer contacts with the insurance provider (e.g., dates and summaries of past telephone calls, past emails, past instances in which on-line tools of the insurance provider were utilized, etc.) and/or past customer contacts with other entities associated with the insurance provider.

Each of policy records 132, claims records 134 and/or communication log 136 may include a single database, or multiple databases. For example, policy records 132 may include a first database for auto policy information, a second database for fire/home policy information, etc. Similarly, claim records 134 may include a first database for auto claim information, a second database for fire/home claim information, etc. As another example, communication log 136 may include a first database for telephone contacts between customers and the insurance provider, a second database for online contacts between customers and the insurance provider, etc.

The persistent memory or memories of the computing system 104 may also store business rules 140. Business rules 140 may define any processes, procedures, algorithms, guidelines, etc., of the insurance provider. For example, business rules 140 may store role-based rules 154, which may define which set of linked applications 112 should be available to which users (e.g., based upon user job type/function, as discussed above), and/or may define which types of information that one or more of the linked applications 112 may display to different types of users.

The instructions of the workbench application 110 may include a number of application programming interfaces (APIs) 142. Generally, the APIs 142 may enable the workbench application 110 to communicate with the linked applications 112 by receiving data, messages and/or commands from the linked applications 112, and/or by passing data, messages and/or commands to the linked applications 112. The workbench application 110 may also include various units having different functionalities, including an integrated search unit 144, a caller determination unit 146, an auto-population unit 148, a text recognition unit 150 and/or a contextual assistance unit 152.

In other embodiments, the workbench application 110 may include more, fewer and/or different units than are shown in FIG. 2, and/or one or more of the units shown in FIG. 2 may instead be implemented by one of the linked applications 112. The instructions of the workbench application 110 may perform the functions of the various units when the instructions are executed by one or more processors of the computing system 104 (not shown in FIG. 2), for example. One, some or all of the units 144, 146, 148, 150 and 152 may utilize the appropriate ones of the APIs 142 as needed to implement the functions described herein.

The integrated search unit 144 may provide integrated search capabilities across one or more internal databases of the computing system 104 (e.g., within records 130), across one or more external sources (e.g., using a web-based search engine and/or a web-based mapping application), and/or by utilizing search features of one or more applications of linked applications 112 (e.g., an enterprise customer information system included in the other tools/applications 120). The integrated search unit 144 may provide a consistent, single user interface that allows the claim associate to enter search terms. The integrated search unit 144 may also, or instead, perform searches based upon calls/requests from other units (e.g., from caller determination unit 146 and/or from text recognition unit 150, as discussed below). Results found by the integrated search unit 144 may be presented to the claim associate, and may be integrated with one or more of the other units of the workbench application 110 and/or one or more of the linked applications 112 (e.g., as discussed further below in connection with the auto-population unit 148). In some embodiments, the claim associate may save search results and/or search parameters, and may later retrieve saved results to refine or act upon the search results.

The caller determination unit 146 may determine, or help to determine, the identity of a caller with whom the claim associate is speaking by phone. To this end, the caller determination unit 146 may interface with a telephone caller ID system (not shown in FIG. 2) that automatically identifies caller phone numbers. The telephone caller ID system may be a part of a system provided by a telephone service provider, for example, and may include hardware, firmware and/or software configured to identify incoming call phone numbers. The caller determination unit 146 may provide the identified phone number to the integrated search unit 144, which may then use the phone number to locate other information associated with the caller (e.g., name, home address, policies, claims, recent contacts with the insurance provider, etc.). To locate the caller information, the integrated search unit 144 may search multiple internal databases and/or systems, such as databases associated with different business lines (auto, fire/home, etc.) in policy records 132, databases associated with different business lines in claims records 134, one or more databases within communication log 136, enterprise claim system 116, and/or an enterprise customer information system (e.g., included in the other tools/applications 120), for example. The caller information may be presented in a streamlined customer overview display within the user interface of the workbench application 110, for example.

The auto-population unit 148 may automatically enter information into fields associated with one or more of the linked applications 112 (e.g., one or more fields associated with the loss reporting tool 114, the enterprise claim system 116, etc.). The information used to populate the field(s) may come from various sources. In some embodiments and scenarios, for example, the auto-population unit 148 may use information that the claim associate entered in a field associated with one of the linked applications 112 as the source (e.g., so that it is not necessary for the claim associate to make duplicate entries of the same information in other of the linked applications 112). In other embodiments and/or scenarios, the auto-population unit 148 may use information associated with search results obtained by the integrated search unit 144 as the source. If the caller determination unit 146 passed a phone number to the integrated search unit 144, and if the integrated search unit 144 searched internal databases to locate personal information corresponding to that phone number (e.g., name, address, policy information, claim information, family members, etc.), for example, the auto-population unit 148 may use the located information as the source.

While the auto-population unit 148 is described herein as "automatically" entering information into fields, it is understood that, in some embodiments and/or scenarios, the claim associate may first be prompted to confirm that an entry is correct for a particular field, and/or may be prompted to choose the appropriate entry from among two of more candidate entries, etc. Returning to the embodiment and scenario in which the caller determination unit 146 passes a phone number to the integrated search unit 144, for example, the integrated search unit 144 may return a list of people and policies potentially matching the phone number (e.g., different people with different polices, and/or multiple entries of a single person but with different associated policies, etc.). The user interface of the workbench application 110 may then prompt the claim associate to confirm the correct person and/or policy before the auto-population unit 148 proceeds to populate any fields using that information.

The text recognition unit 150 may identify/recognize keywords (e.g., terms and/or phrases) that the claim associate entered using text editor tool 118, and may categorize the keywords such that the auto-population unit 148 may enter corresponding information into the appropriate field(s) of one or more of the linked applications 112. If the claim associate writes "Linda Johnson in auto accident on Feb. 10, 2014" using text editor tool 118, for example, the text recognition unit 150 may categorize "Linda Johnson" as a name, and pass the name to the auto-population unit 148 for entry in a name field of loss reporting tool 114 and/or enterprise claim system 116. Alternatively, or additionally, the text recognition unit 150 may automatically pass the name to the integrated search unit 144 such that a search is conducted using that name as a keyword (e.g., a search of policy records 132, claims records 134 and/or communication log 136). Continuing with the above example, the text recognition unit 150 may categorize "Feb. 10, 2014" as a date, and pass the name to the auto-population unit 148 for entry in a date of loss field of loss reporting tool 114 and/or enterprise claim system 116. In various embodiments, the text recognition unit 150 may be configured to recognize names of people, dates, times of day, street names, street addresses, intersections, city names, state names, vehicle information (e.g., make/model/year), service provider names (e.g., body shop names), venue/point-of-interest names, and/or other types of information.

In some embodiments, the text recognition unit 150 may highlight (e.g., underline) entered words and/or phrases that are identified as having potential (but unconfirmed) importance, and allow the claim associate to select each highlighted word and/or phrase in order to open a menu of possible actions that may be performed. For example, the text recognition unit 150 may recognize a series of numbers and words (e.g., "1147 Madison Street") as a likely address, and highlight that text for the claim associate. The claim associate may then right-click on the text to open a drop-down menu of options, such as a "Home Address" option to cause auto-population unit 148 to use that address to populate an insured's home address field (e.g., in a user interface of loss reporting tool 114), a "Map" option to cause the integrated search unit 144 to retrieve a map showing the location of the address, an "Ignore" option to take no action based upon the address, and so on.

The contextual assistance unit 152 may generally determine dynamic and/or interactive "word tracks" that may guide the claim associate as he or she uses one or more of the linked applications 112. The workbench application 110 may present the appropriate word tracks, as identified by the contextual assistance unit 152, to the claim associate within the user interface of the workbench application 110 (e.g., within a dedicated area of the user interface, and/or appearing in other areas of the user interface that are typically used for other purposes, such as the customer overview area). For example, the contextual assistance unit 152 may determine the appropriate/applicable prompts as the claim associate builds a loss report using the loss reporting tool 114, or otherwise handles a claim using the enterprise claim system 116, etc. The word tracks may include jurisdictional information/documents/tools, such as standard claim processes (SCPs) that are specific to a state's requirements, for example.

In some embodiments, certain "triggers" may cause applicable topics to be displayed to the claim associate. If the claim associate moves to a page or screen related to a rental property, for example, a rental SCP may be displayed to the claim associate. The text displayed by contextual assistance unit 152 may also depend upon the user or the user's role (e.g., as specified by role-based rules 154). Text items, prompts, etc., provided by the contextual assistance unit 152 may be stored in business rules 140 and/or elsewhere.

In various embodiments, the contextual assistance unit 152 may also provide other types of information and/or references, such as weather alerts (e.g., linking to a map with information regarding key areas that have recently been affected by extreme weather conditions such as hail, high winds, fire, etc.), customizable job aids (e.g., a repair facility locator, state-by-state issues relating to policies and/or event location), life event alerts (e.g., recent marriage, death, new child, new driver, etc.), operational and/or claim procedure guides, and so on. In some embodiments, word tracks (e.g., SCPs) presented by the contextual assistance unit 152 are time-stamped to indicate that the word tracks have been shown to the claim associate.

While multiple claim associates and client devices may, in some embodiments, access the workbench application 110, for clarity FIG. 2 illustrates only the example client device 102 of a single claim associate. As illustrated in FIG. 2, client device 102 may include a central processing unit (CPU) 160 to execute computer-readable instructions, a random access memory (RAM) 162 to store the instructions and data during operation of programs, a data storage 164 that may include persistent memory to store data used by the programs executed by CPU 160, and a program storage 166 that may include persistent memory to store the programs/instructions executed by CPU 160, including, for example, a web browser application 170.

By way of example, the data storage 164 and/or the program storage 166 may be implemented on a hard disk drive coupled to CPU 160 via a bus (not shown in FIG. 2). More generally, the components 160, 162, 164 and 166 may be implemented in any suitable manner according to known techniques. Client device 102 may be a personal computer (e.g., a desktop, laptop, notebook, etc.), or any other suitable stationary or portable computing device, such as a tablet, phablet, smart watch, smart glasses, smartphone, or other mobile device, for example. While client device 102 in the example of FIG. 2 may include both storage and processing components, client device 102 may instead be a so-called "thin" client that depends upon another computing device for certain computing and/or storage functions. For example, data storage 164 and/or program storage 166 may be external to client device 102 and connected to client device 102 via a network link.

Further, client device 102 may be coupled to an input device 172 that allows the claim associate to enter inputs to client device 102, and an output device 174 that allows the claim associate to view outputs/displays generated by client device 102. The input device 172 may include one or more different devices, such as a pointing device (such as a mouse, a keyboard, a trackball device, a digitizing tablet and/or a microphone, for example). The output device 174 may also include one or more different devices, such as a display monitor or a set of two or more display monitors, for example. In one embodiment, input device 172 and output device 174 may be integrated as parts of a single device (e.g., a touch screen device). Using the input device 172 and the output device 174, a claim associate may be able to interact with graphical user interfaces (GUIs) provided by the client device 102.

When CPU 160 executes the web browser application 170, RAM 162 may temporarily store the instructions and data required for its execution. In FIG. 2, the web browser application 170 being executed is represented in the program space of RAM 162 as web browser application 176. When the claim associate uses the web browser application 176 to access the workbench application 110 (i.e., in an embodiment where the workbench application 110 is provided as one or more web pages), for example, the instructions of the corresponding web page(s) may be stored as a local copy (not shown in FIG. 2) in RAM 162, and the web browser application 176 may interpret the instructions of the local copy. When interpreting the instructions, the web browser application 176 may present the user interface of the workbench application 110, including any user interfaces that are integrated via one or more of the linked applications 112, to the claim associate, and may allow the associate to interact with the presented user interface(s).

In an alternative embodiment, some of the components shown in computing system 104 may instead reside in the client device 102. For example, some or all of the workbench application 110, and/or some or all of the linked applications 112, may reside within program storage 166 after being installed on the client device 102 (e.g., after being downloaded from the computing system 104, or after being installed from a portable memory device, etc.). In one such embodiment, the workbench application 110 and/or linked applications 112 may communicate with the computing system 104 via network 106 to access records 130, business rules 140, and/or other databases of the computing system 104 as needed (e.g., when performing a search of internal records using integrated search unit 144, when accessing the latest SCPs using contextual assistance unit 152, etc.).

IV. Exemplary User Interface Displays

Operation of the components in the environment 100 will now be described with reference to the example user interface displays provided in FIGS. 3 through 15. The user interface displays in some of FIGS. 3 through 15 refer to a "left monitor" and a "right monitor," which may represent the appearance of two monitor screens (e.g., screens of two monitors of output device 174) when a claim associate has used the web browser application 176 to access the workbench application 110, for example.

In some embodiments, however, the precise layout (e.g., sizes and/or position) of various portions of the user interface displays may be different, and/or may be presented on only a single monitor (or on more than two monitors). Moreover, the layout may be configurable by the claim associate (e.g., according to saved presets for the associate, and/or as the associate is working within the workbench application 110) and/or by other individuals (e.g., by information technology staff), and/or may be automatically configured (e.g., based on job function of the user, according to role-based rules 154). Additionally, it is understood that the information, links, tools and/or functionality provided by the user interface displays of FIGS. 3 through 15, and/or described below, may be different in other embodiments and/or scenarios.

When a customer calls the claim associate (e.g., to report an accident or other loss event and initiate a claim), the workbench application 110 may provide a user interface display 200 to the claim associate (e.g., on the left monitor screen), as shown in the example embodiment of FIG. 3. The caller determination unit 146 may access a caller identification system to determine the phone number from which the call was made, and the workbench application 110 may display that number to the associate in an area 202 of the user interface display 200. The user interface display 200 may also include guidance for the claim associate, such as a message 204 prompting the associate to ask the caller certain questions.

The integrated search unit 144 may automatically search policy records 132 to identify all policyholders associated with the phone number, and to identify all insurance policies of those policyholders. The workbench application 110 may display the identified policyholder(s) in a policyholder confirmation area 206 of the user interface display 200, and display the identified policy or policies (e.g., all policies listing the identified policyholder(s)) in a policy confirmation area 208 of the user interface display 200.

In the scenario represented by FIG. 3, two policyholders and three policies have been found. As seen in FIG. 3, the workbench application 110 may provide check box controls 210A and 210B for the two identified policyholders, and check box controls 212A through 212C for the three identified policies. The claim associate may then ask the caller to confirm her identity (e.g., her name, if not already provided), and/or to provide enough information to determine the relevant policy.

Once confirmed by the caller, the claim associate may select the corresponding person and policy from the lists displayed on the user interface display 200 (in this scenario, "Sofia Smith" and auto policy "12-EL-4135-8"), e.g., by clicking on the appropriate ones of check box controls 210 and 212. In other embodiments, the controls 210 and/or the controls 212 may be other suitable types of controls (e.g., radio buttons, etc.). In some embodiments, the confirmation is not complete until the claim associate activates a virtual button (or other user-interactive control) 214. If the claim associate does not wish to confirm any policyholder or policy (e.g., if none of the presented options appears to be correct), the associate may activate a virtual button (or other user-interactive control) 216.

Figure 4:
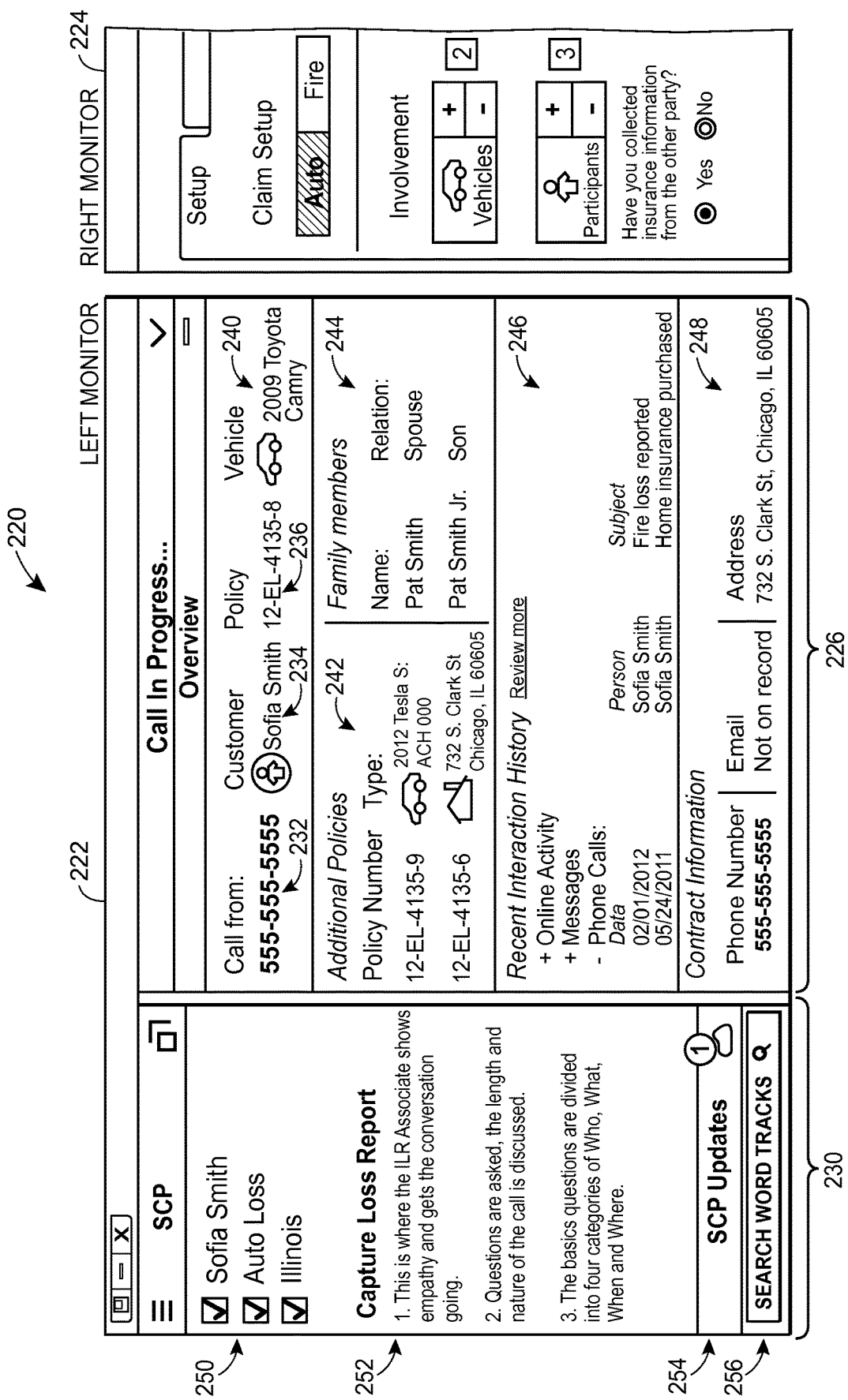
FIG. 4 depicts an exemplary display arrangement that may be presented after caller information is confirmed, according to one embodiment.

Once the claim associate has confirmed the person and policy via the user interface display 200 (or bypassed confirmation by selecting the virtual button 216), the workbench application 110 may present the user display arrangement 220 seen in the exemplary embodiment of FIG. 4. The display arrangement 220 may include a first user interface display 222 (e.g., on the left monitor screen) and a second user interface display 224 (e.g., on the right monitor screen). The first user interface display 222 may provide the claim associate with a customer overview 226 containing more detailed information about the caller, and may also include a contextual assistance area 230 to provide real-time guidance to the claim associate (as discussed further below). The second user interface display 224 (only partially shown in FIG. 4) may allow the claim associate to enter information for a loss report, and may be generated by loss reporting tool 114, for example.

The customer overview 226 may include an indicator 232 of the identified phone number, and indicator 234 of the identified/confirmed person's name, and an indicator 236 of the identified/confirmed policy number. Moreover, to gather additional information for the customer overview 226, the integrated search unit 144 may use the person's name and/or policy number to locate other information associated with the person and policy (e.g., information included in various databases of records 130 and/or information from external sources).

As seen in FIG. 4, for example, the customer overview 226 may also include an indicator 240 of a property covered by the policy (here, a vehicle make, model and year), a list 242 of additional insurance policies for the person (e.g., some or all of the other policies that were initially returned by the integrated search unit 144 and shown in policy confirmation area 208), a list 244 of family members of the person, a list 246 of recent interactions between the person and the insurance provider (e.g., within the six months, the last year, the last five years, etc.), and/or a list 248 of contact information for the person (e.g., the identified phone number, an email address, a home address, etc.). The integrated search unit 144 may identify family members for the list 244 and contact information for the list 248 by searching one or more databases in policy records 132, and may retrieve the recent interaction history for the list 246 by searching one or more databases in communication log 136, for example. The list 246 of recent interactions may include expandable-view categories for different communication categories, such as online activity/contacts (e.g., via the insurance provider's online claim services, etc.), electronic messages (e.g., emails, text messages, etc.) and phone calls, for example, and may help the claim associate to more quickly ascertain the reason for the customer's call.

Once the integrated search unit 144 returns the information, the workbench application 110 may display the information in the customer overview 226. Moreover, the auto-population unit 148 may use some or all of the information to automatically fill fields associated with one or more of the linked applications 112 (e.g., name fields, home address fields, etc.), such as the loss reporting tool 114 and/or the enterprise claim system 116. For example, some or all of the information may be used to automatically fill one or more loss reporting fields in the second user interface display 224 on the right monitor screen. As a more specific example, the policy number may be used to select "auto" in a claim/insurance type field provided by the loss reporting tool 114, the caller's name may be used to populate an "insured's name" field provided by the loss reporting tool 114, and the vehicle information may be used to populate one or more "insured's vehicle" fields provided by the loss reporting tool 114.

The contextual assistance unit 152 may provide some or all of the information shown in the contextual assistance area 230. The contextual assistance area 230 may include a list 250 of factors/information relevant to the procedures that should be followed by the claim associate during the call, enumerated "word tracks" 252 to help guide the claim associate in conducting the call and/or entering information in the user interface for the loss reporting tool 114, one or more links to additional information (e.g., a link 254 to "SCP Updates"), and/or a field 256 for entering keywords when searching the content of word tracks (e.g., the content of all available word tracks, including those not currently shown in the contextual assistance area 230).

Generally, the content of the word tracks 252 may be dynamically determined by the contextual assistance unit 152 based upon various factors, such as the factors in the list 250. For example, the name of the caller may be inserted into the guidance at various times (e.g., as discussed below in connection with FIG. 5), the type of loss (e.g., fire/home or auto) and the applicable jurisdiction may be used to determine which questions the claim associate should be prompted to ask, etc.

Figure 5:
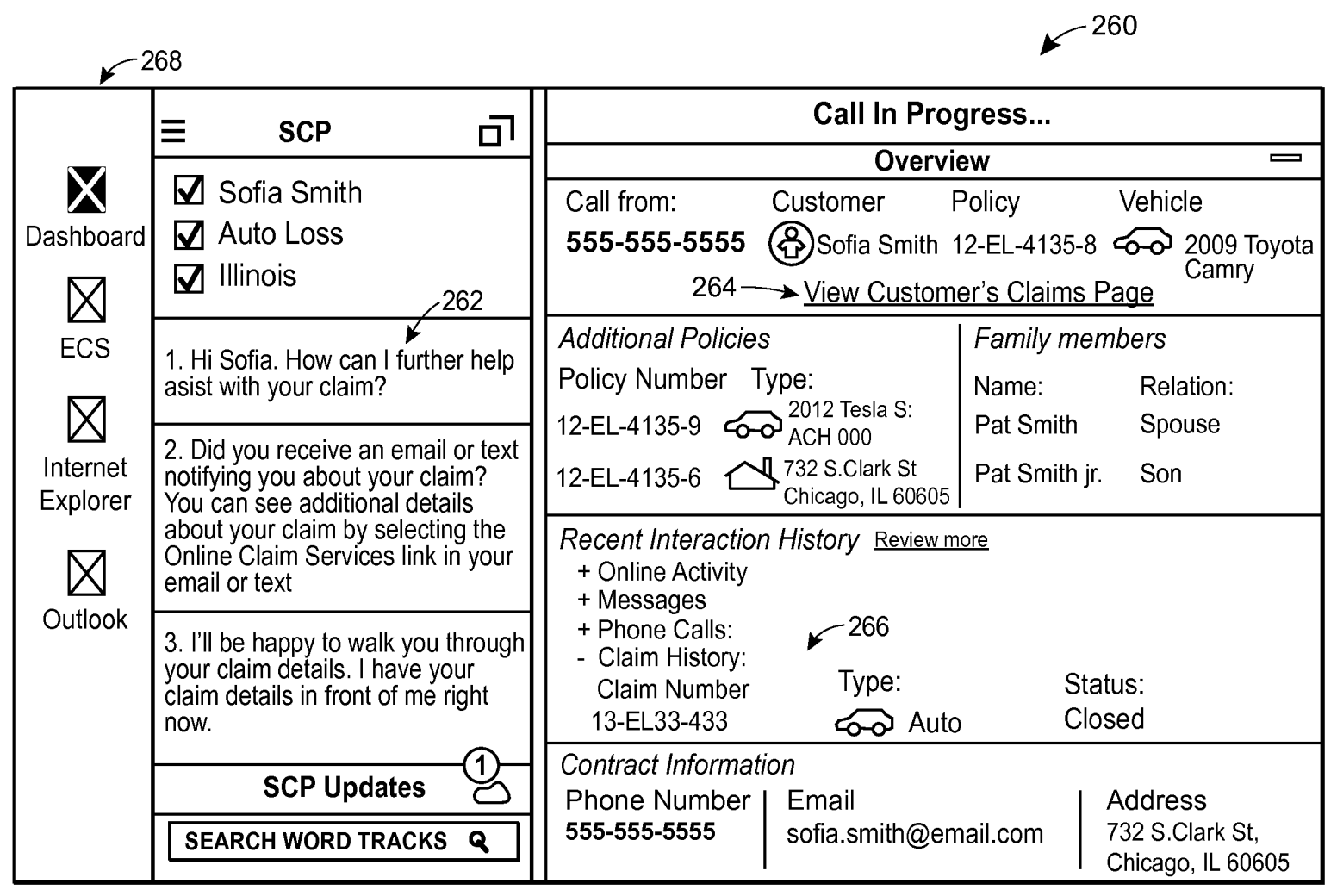

The user interface display 260 shown in FIG. 5 (e.g., on the left monitor screen) may represent a different embodiment than the user interface display 220 shown in FIG. 4, or may be a different display to which the claim associate has navigated. As noted above and seen in FIG. 5, word tracks 262 may provide guidance that is customized to the identified person (e.g., by inserting the customer's name into the word tracks). Moreover, the workbench application 110 may provide a selectable link 264 to an online claim service ("View Customer's Claims Page") so that the claim associate may review claim details along with the customer.

As is also seen in FIG. 5, the recent interaction history may further include an expandable-view "claim history" section 266 which, if selected by the claim associate, may display claims for the identified person and policy (e.g., within the last year, the last five years, etc.), as well as the status of each such claim (e.g., "open" or "closed"). The claim history information may be information that the integrated search unit 144 was able to locate in the claims records 134 using the identified person and/or policy, for example.

The user interface display 260 may also include a short-cut area 268 with links to one or more applications, such as enterprise claim system 116 ("ECS"), for example. In other embodiments, the short-cut area 268 may include links to more, fewer and/or different applications than those shown in FIG. 5. Moreover, the short-cut area 268 may be provided along with more (e.g., all) of the left monitor screen displays shown in FIGS. 3-15, or may be provided on the right monitor screen displays, etc.

Figure 6:
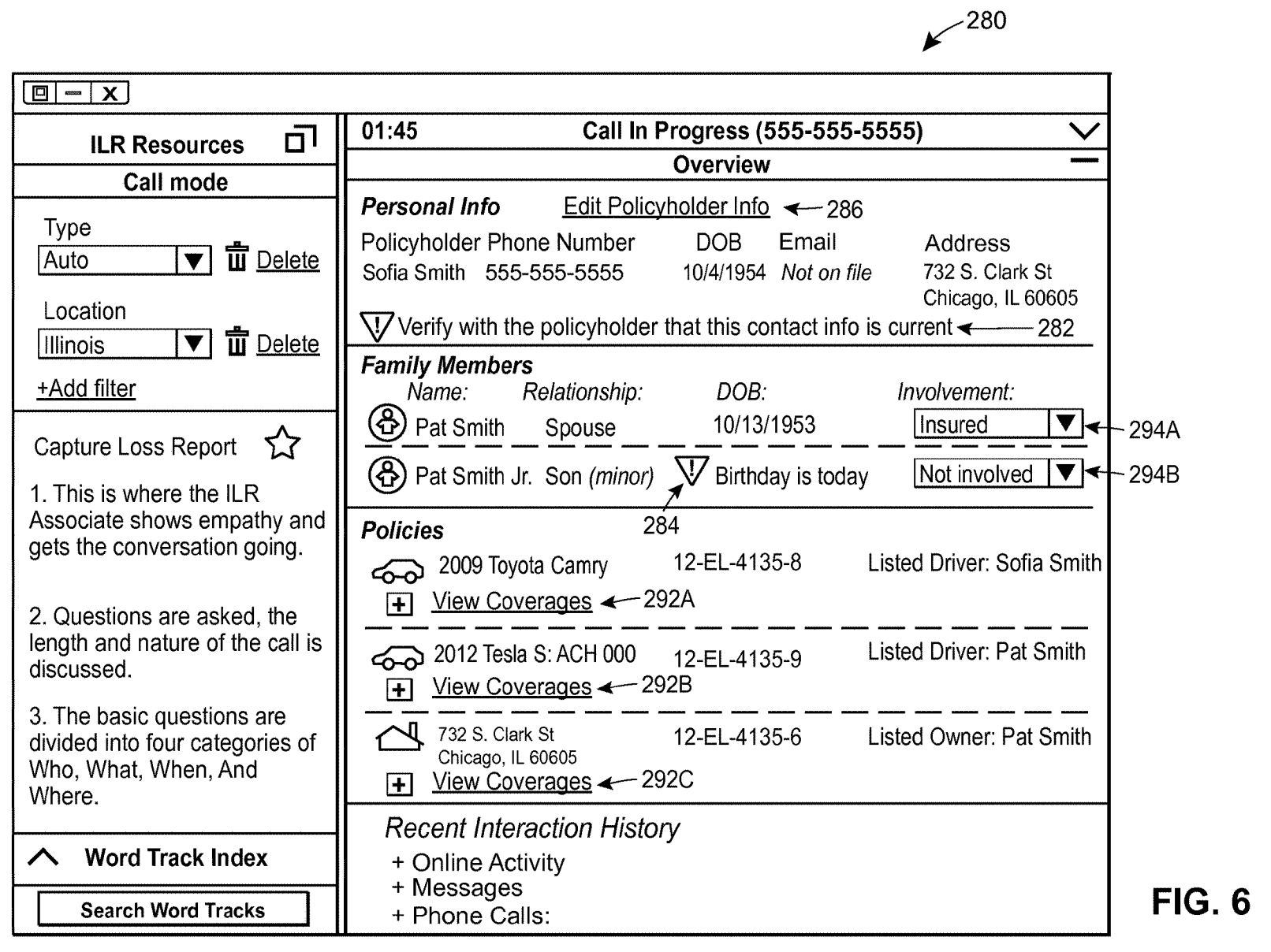

The user interface display 280 shown in FIG. 6 (e.g., on the left monitor screen) may represent a different embodiment than one of both of the user interface displays 220 and 260 shown in FIGS. 4 and 5, respectively, or may be a different display to which the claim associate has navigated. As seen in FIG. 6, the workbench application 110 may incorporate various alerts into the user interface display 280. If retrieved information has not been updated in an amount of time specified by business rules 140 (or if the last contact from the customer was at least a threshold amount of time ago, etc.), for example, business rules 140 may dictate that the workbench application 110 display a message 282 prompting the claim associate to verify that the contact information for the policyholder is correct.

As another example, if policy records 132 show that the caller's birth month and day, or a family member's birth month and day, are the same as the current month and day, business rules 140 may dictate that the workbench application 110 display a message 284 indicating as much to the claim associate. As other examples, business rules 140 may dictate that the workbench application 110 display messages (not shown in FIG. 6) alerting the claim associate to customer life events such as a recent marriage, death, new child, new driver, etc. As still another example, if the integrated search unit 144 (or other unit implemented by the computing system 104) determines that severe weather is at or near the current location of a vehicle of the caller (or the current location of the caller, or the location of the home of the caller, etc.), business rules 140 may dictate that the workbench application 110 display messages (not shown in FIG. 6) alerting the claim associate to the severe weather so that he or she may inform the caller. Moreover, the workbench application 110 may be integrated with the enterprise claim system 116 to generally provide claim alerts to the claim associate via the user interface.

As is also seen in FIG. 6, the workbench application 110 may provide a link 286 that enables the claim associate to edit the identified caller's information. Moreover, the workbench application 110 may provide links 292A through 292C that enable the claim associate to view additional coverage information (e.g., coverage types, deductibles, limits, etc.) for any of the policies that the integrated search unit 144 had identified for the caller, and that the workbench application 110 has displayed in the user interface display 280.

The user interface display 300 shown in FIG. 7 (e.g., on the left monitor screen) may represent a different embodiment than some or all of the user interface displays 220, 260 and 280 shown in FIGS. 4, 5 and 6, respectively, or may be a different display to which the claim associate has navigated. As seen in FIG. 7, the workbench application 110 may provide not only a list 302 of open claims and/or a list 304 of closed claims for the caller, but also links 306 that enable the claim associate to obtain more detailed information about each claim. The links 306 may be displayed and made available for selection only when the claim associate expands the list 302 or the list 304, for example. In the embodiment and scenario of FIG. 7, a first link 306A corresponds to an open auto claim of the caller, and a second link 306B corresponds to an open fire/home claim of the caller.

FIG. 8 shows a portion of a user interface display 310 as it may appear (e.g., on the left monitor screen) when the associate has selected the claim "12-3D45-678" using link 306A, for example. As seen in FIG. 8, the workbench application 110 may provide a link 312 to the policyholder claim page for the selected claim.

Figure 9:
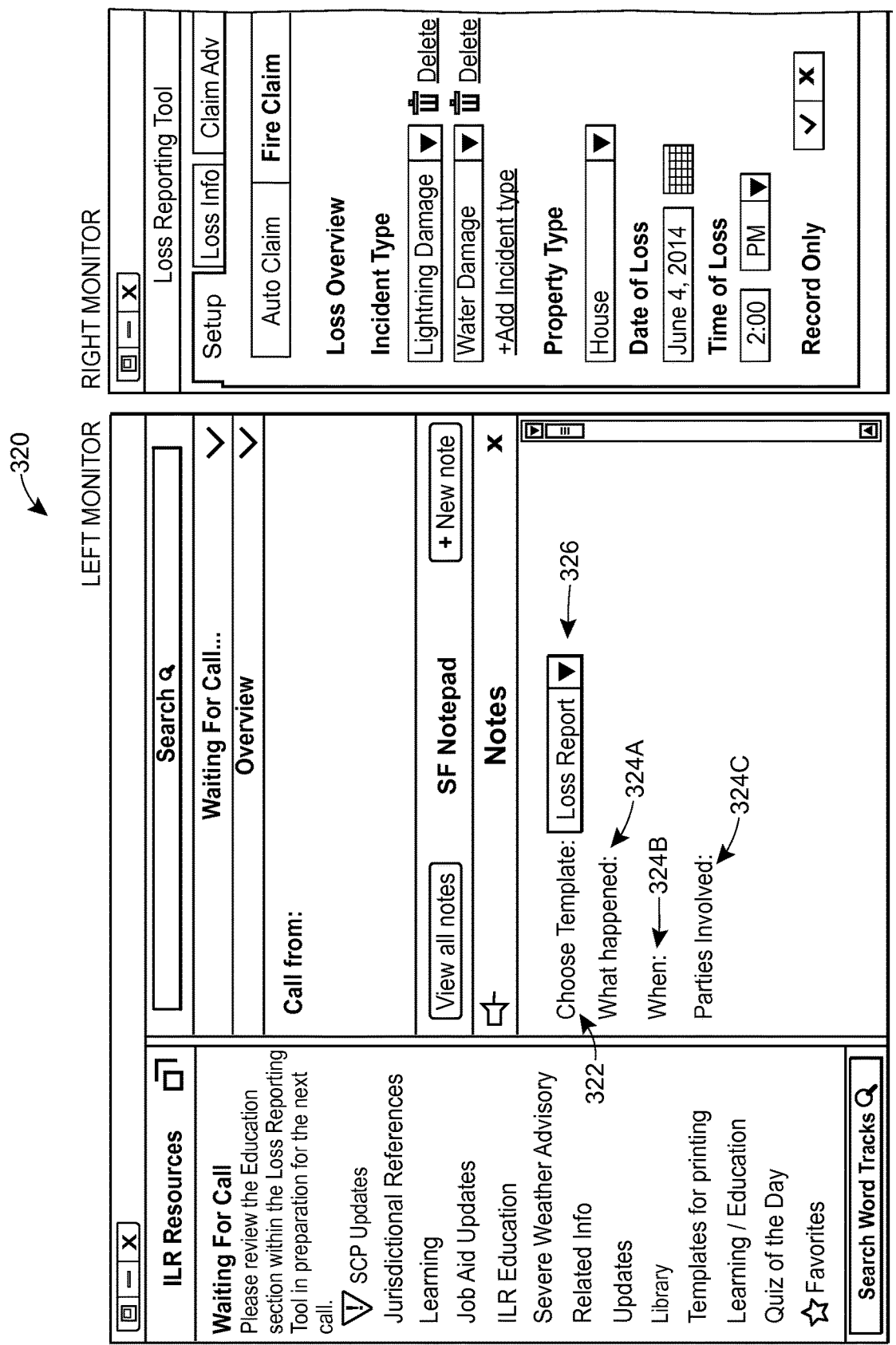
FIG. 9 depicts an exemplary display arrangement that may be presented while waiting for a new customer call, according to one embodiment.

During calls with customers, and/or while waiting for a call, a claim associate may desire to take free-form notes. FIG. 9 shows an exemplary display arrangement 320 in which the workbench application 110 communicates with the text editor tool 118 (or in which the text editor tool 118 is provided directly by the workbench application 110) to enable the associate to type such notes in a notes area 322 (e.g., on the left monitor screen). The text recognition unit 150 may automatically identify, within the typed text, keywords (e.g., individual words, and/or phrases with multiple words) that may be of particular relevance to the loss report. For example, the text recognition unit 150 may identify location names (e.g., street addresses or intersections, town names, etc.), names of people, times, dates, descriptions of vehicles (e.g., make, model, year) and/or other properties, and so on.

To identify these keywords, the text recognition unit 150 may compare the words of the text entered by the claim associate to a keyword database, such as a database stored in business rules 140, for example. The keyword database may include a collection of known location names, vehicle makes and models, and so on. Alternatively, or in addition, the text recognition unit 150 may pass the words of the entered text to the integrated search unit 144, which may search internal databases of the insurance provider (e.g., one or more databases storing records 130) to determine whether one or more of those words correspond to information in the insurance provider's records.

The workbench application 110 may provide various categories of information to guide the claim associate's note-taking, such as a first category 324A ("What happened"), a second category 324B ("When") and a third category 324C ("Parties involved"), for example. The categories 324 displayed by the workbench application 110 may depend on a notes template selected by the claim associate (e.g., in FIG. 9, the "Loss Report" template) using a template selector 326.

Moreover, the text recognition unit 150 may make use of the categories 324 in which notes are entered to help determine whether a term or phrase relates to a type of event, a location or a person. For example, the text recognition unit 150 may recognize the word "Ford" as a vehicle make if it is entered under the "What happened" category 324A, but instead recognize "Ford" as a person's name if it is entered under the "Parties involved" category 324C. In other embodiments, the text recognition unit 150 may not take the categories 324 into account when processing the text of the notes, and/or the notes area 322 may not provide any note categories.

FIG. 10 shows an exemplary display arrangement 330, which may correspond to a scenario in which the claim associate has types or otherwise entered various notes 334 (e.g., in the notes area 322 of FIG. 9) based upon a call with the customer Sofia Smith. In this example scenario, the notes 334 may include a brief description of the location (intersection, town, state) where the accident occurred in a "What happened" category, the date of the accident in a "When" category, and/or the name of a party involved in the accident in a "Parties involved" category. The text recognition unit 150 may recognize that a location, date and name have been entered, and automatically provide the location, date and/or name to the auto-population unit 148. The auto-population unit 148 may then use the location, date and/or name to automatically populate corresponding fields in the user interface display(s) provided by loss reporting tool 114 and/or other of the linked applications 112.

As seen in the (partially shown) right monitor screen in FIG. 10, for example, the auto-population unit 148 has used the date "Feb. 10, 2014" within the notes 334 to populate the "Date of Loss" field 332 in the user interface display of the loss reporting tool 114. In other embodiments and/or scenarios, the auto-population unit 148 may convert the format of certain types of information before populating fields (e.g., converting "2/10/14" in the notes 334 to "Feb. 10, 2014" in the loss report field 332, etc.).

Figure 11:
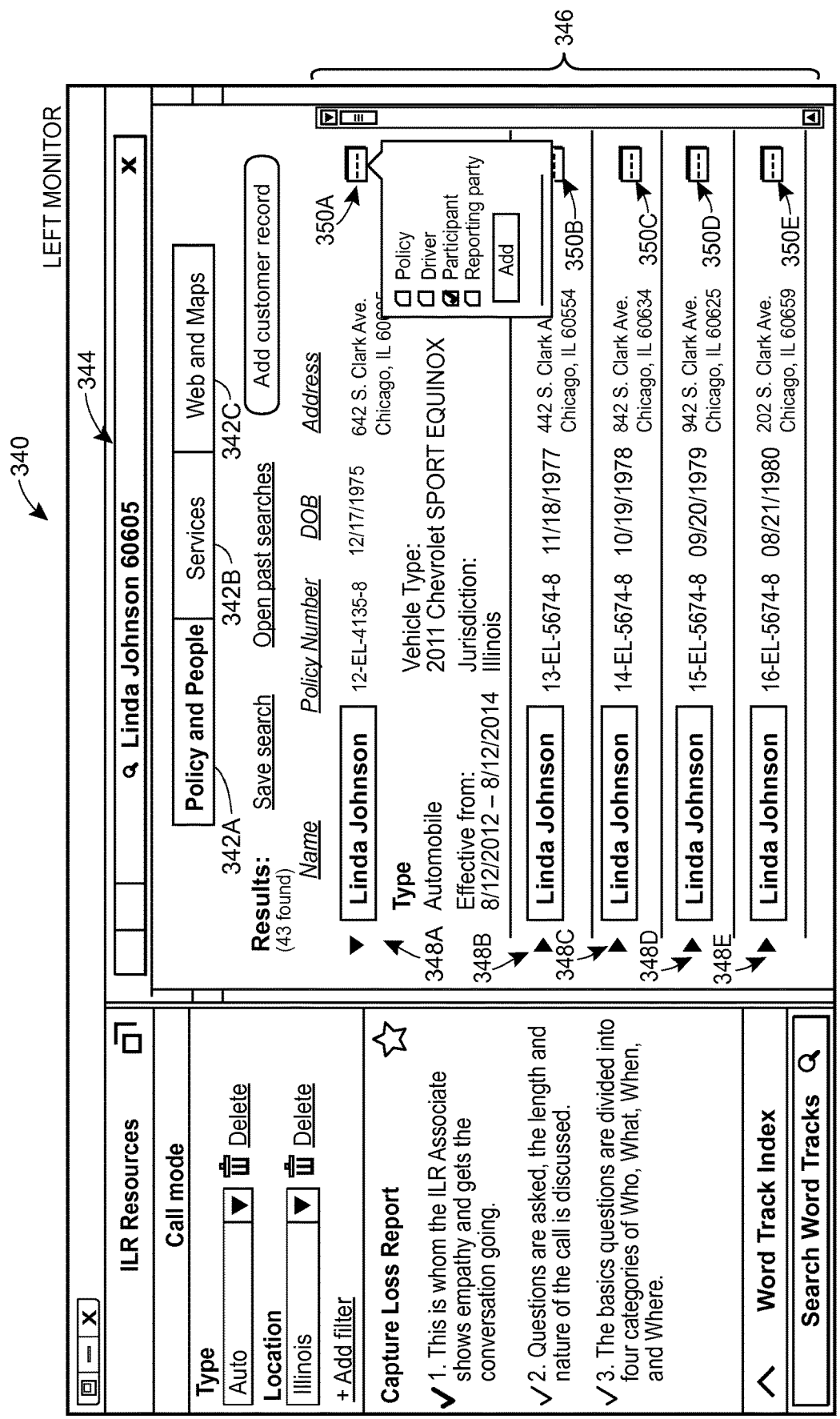
FIG. 11 depicts an exemplary user interface display that provides an integrated search tool, in a scenario in which a first search mode has been selected, according to one embodiment.

As noted above, the workbench application 110 may also provide integrated search capabilities. As seen in FIG. 11, for example, a user interface display 340 (e.g., shown on the left monitor screen) may provide user-interactive controls 342, any one of which the claim associate may activate in order to select a desired search mode that is to be utilized by the integrated search tool 144.

The applied search mode may dictate which database(s)/sources are searched by the integrated search tool 144, and/or the manner in which search results are provided. For example, the claim associate may activate (e.g., click on) control 342A to select the "Policy and People" search mode (e.g., to cause the integrated search unit 144 to search policy records 132 and/or an enterprise customer information system), control 342B to select the "Services" search mode (e.g., to cause the integrated search unit 144 to use an external search engine for finding service providers such as auto repair shops), or control 342C to select the "Web and Maps" search mode (e.g., to cause the integrated search unit 144 to use an external search engine or mapping service for finding location information and/or viewing maps). A search field 344 may allow the claim associate to enter terms/ keywords that are to be searched according to the selected search mode (e.g., by searching the sources associated with the selected search mode).

The user interface display 340 of FIG. 11 corresponds to a scenario in which the integrated search tool 144 has provided a results list 346 for a "Policy and People" search of the terms "Linda Johnson 60605." The results list 346 may first appear when the claim associate enters "Linda Johnson 60605" in the search bar at the top of the screen and presses the return key (e.g., in an effort to learn more about the other participant in the accident, as identified by the caller), or when the claim associate activates the control 342A (after already entering the search terms), for example. Alternatively, if the text recognition unit 150 recognized Linda Johnson as a name in the notes typed by the claim associate (e.g., in notes 334 of FIG. 10), the results list 346 and search mode controls 342 shown in FIG. 11 may automatically appear when the claim associate clicks on or otherwise selects the name "Linda Johnson" in the notes, or when the associate selects the "Policy and People" search mode using control 342A, etc.

As seen in FIG. 11, for the "Policy and People" search mode, the results list 346 returned by the integrated search unit 144 may include a number of entries 348 each corresponding to a different people/policy pair. Thus, for example, different ones of entries 348 may include different people with different policies, and/or multiple entries for the same person but corresponding to different policies. The workbench application 110 may also provide controls that enable the claim associate to take particular actions for a particular search result. For example, the claim associate may be provided with interactive controls 350 each corresponding to a different one of the entries 348.

Each of the controls 350 may enable the claim associate to specify the relationship between the person who is listed in the corresponding entry and the loss event being reported. For example, the control 350A may enable the claim associate to specify whether the person listed in entry 348A was a driver in the accident, a participant in the accident, a reporting party for the accident, and/or listed on the policy under which a claim is being reported. If the claim associate selects one or more of the presented options (and possibly activates a virtual "Add" button or other control, as shown in FIG. 11), the auto-population unit 148 may automatically populate the appropriate field(s) of the user interface display provided by the loss reporting tool 114 (e.g., fields shown in the right monitor screen), and/or fields of one or more other of the linked applications 112.

Figure 12:
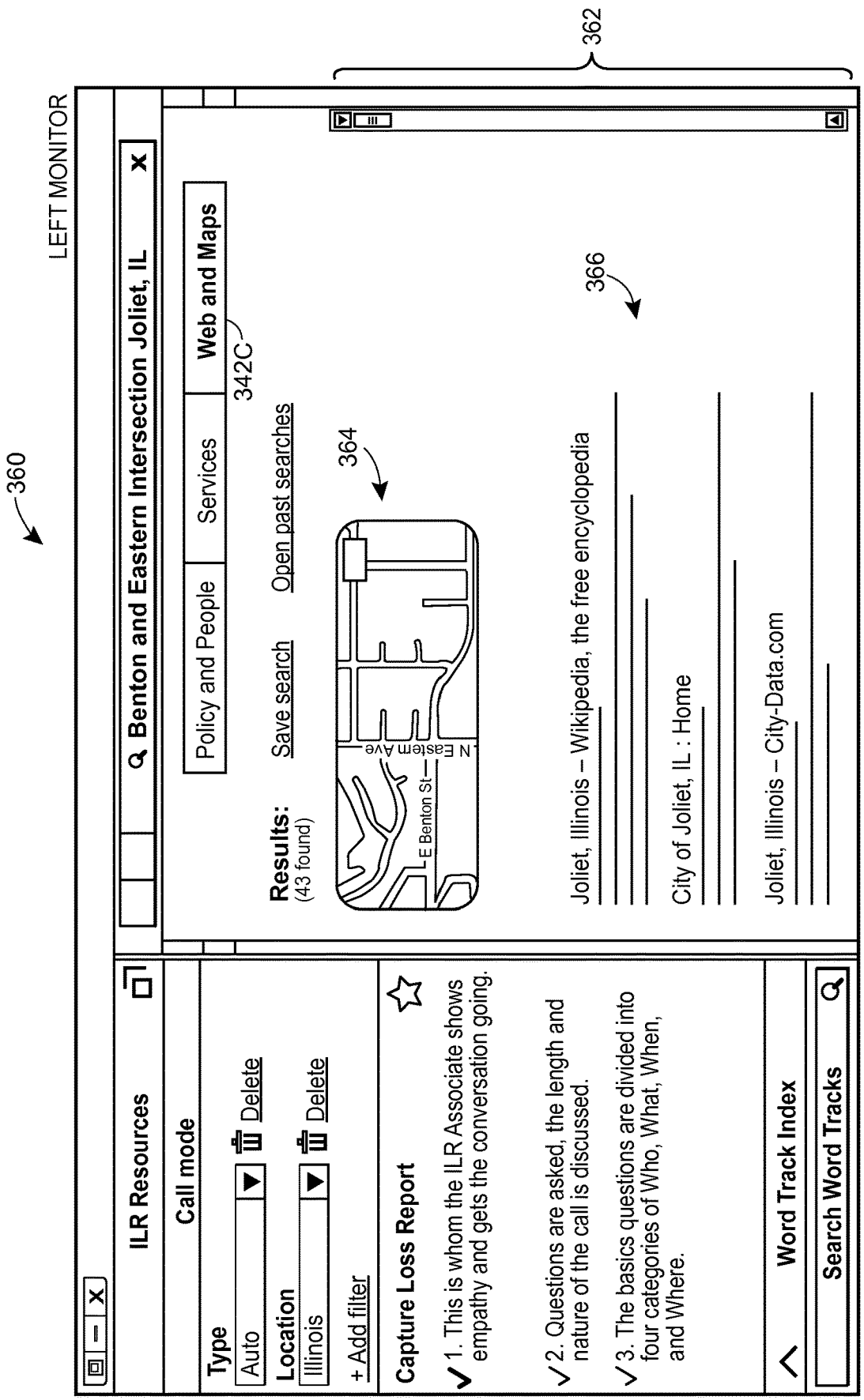
FIG. 12 depicts an exemplary user interface display that provides an integrated search tool, in a scenario in which a second search mode has been selected, according to one embodiment.

FIG. 12 shows an exemplary user interface display 360 provided to the claim associate (e.g., on the left monitor screen) after the integrated search tool 144 has returned a results list 362 for a search of the terms "Benton and Eastern Intersection Joliet, Ill." using the "Web and Maps" search mode. The results list 362 may appear when the claim associate has entered the search terms in the search field and selected the "Webs and Maps" search mode using the control 342C, for example. Alternatively, if the text recognition unit 150 recognized the intersection, town and/or state as location information in the notes typed by the claim associate (e.g., within notes 334 of FIG. 10), the results list 362 may automatically appear when the associate clicks on or otherwise selects the intersection, town and/or state in the notes, or when the associate selects the "Web and Maps" search mode using control 342C, etc.

As seen in FIG. 12, for the "Web and Maps" search mode, the results list 362 returned by the integrated search unit 144 may include a map display 364 showing the location entered in the search field, and/or links 366 to one or more web sites providing additional information about one or more aspects of the location (e.g., information about the town). The workbench application 110 may generate the map display 364 by linking to a third party web-based mapping service/application, and/or may enable the claim associate to expand or change the zoom level of the map display 364 by clicking on the map, for example.

Figure 13:
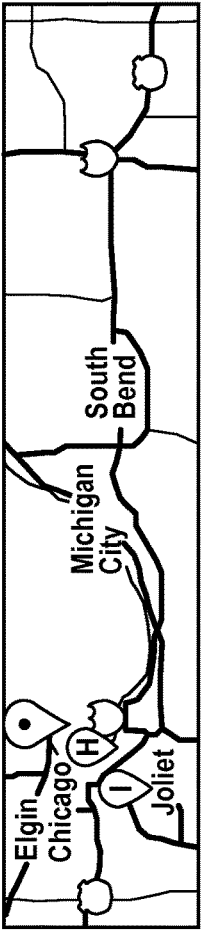
FIG. 13 depicts an exemplary loss reporting tool user interface display, after loss location information has been entered in the notes area of the display of FIG. 10, according to one embodiment.

FIG. 13 shows an exemplary user interface display 370, showing the user interface for the loss reporting tool 114 as provided to the claim associate within the user interface of the workbench application 110 (e.g., on the right monitor screen). The user interface display 370 may correspond to the loss reporting user interface display at a time after the claim associate has entered the intersection, town and state in the notes area (e.g., notes area 322 of FIG. 9), the text recognition unit 150 has recognized/categorized the intersection, town and state as location information, and/or the auto-population unit 148 has used that information to populate the appropriate fields of the loss reporting tool 114.

As seen in FIG. 13, the loss reporting tool 114 may provide its own interface to a mapping service, thereby generated a map display 372. The claim associate may enter additional information relating to the loss/event location, and/or change automatically-populated information, as needed directly from the user interface display 370 (e.g., by entering notes in the "Location notes" field, by changing to the "Setup" tab and editing field contents provided therein, etc.).

As is also seen in FIG. 13, a component of the workbench application 110 that is in communication with the loss reporting tool 114, or the loss reporting tool 114 itself, may also display metrics (e.g., percentages) indicating whether, and/or how much of, each type of information needed for the loss report has been entered. In this scenario, for example, 100% of the event participant information ("Who"), the time information ("When") and the location information ("Where") has been automatically entered (e.g., by the auto-population unit 148) and/or manually entered (e.g., by the claim associate), whereas only 20% of the information needed to describe the event ("What," e.g., the type of accident, etc.) has been entered.

Moreover, the workbench application 110 or the loss reporting tool 114 may apply an algorithm to determine an overall completion metric for display. In this scenario, for example, the "Who," "What," "When" and "Where" percentages are used to determine that 60% of the loss report as a whole has been completed. In some embodiments, similar metrics may also be shown for other information to be entered for the loss report, and/or for other tasks to be performed by the associate (e.g., claim advancing activities).

Figure 14:
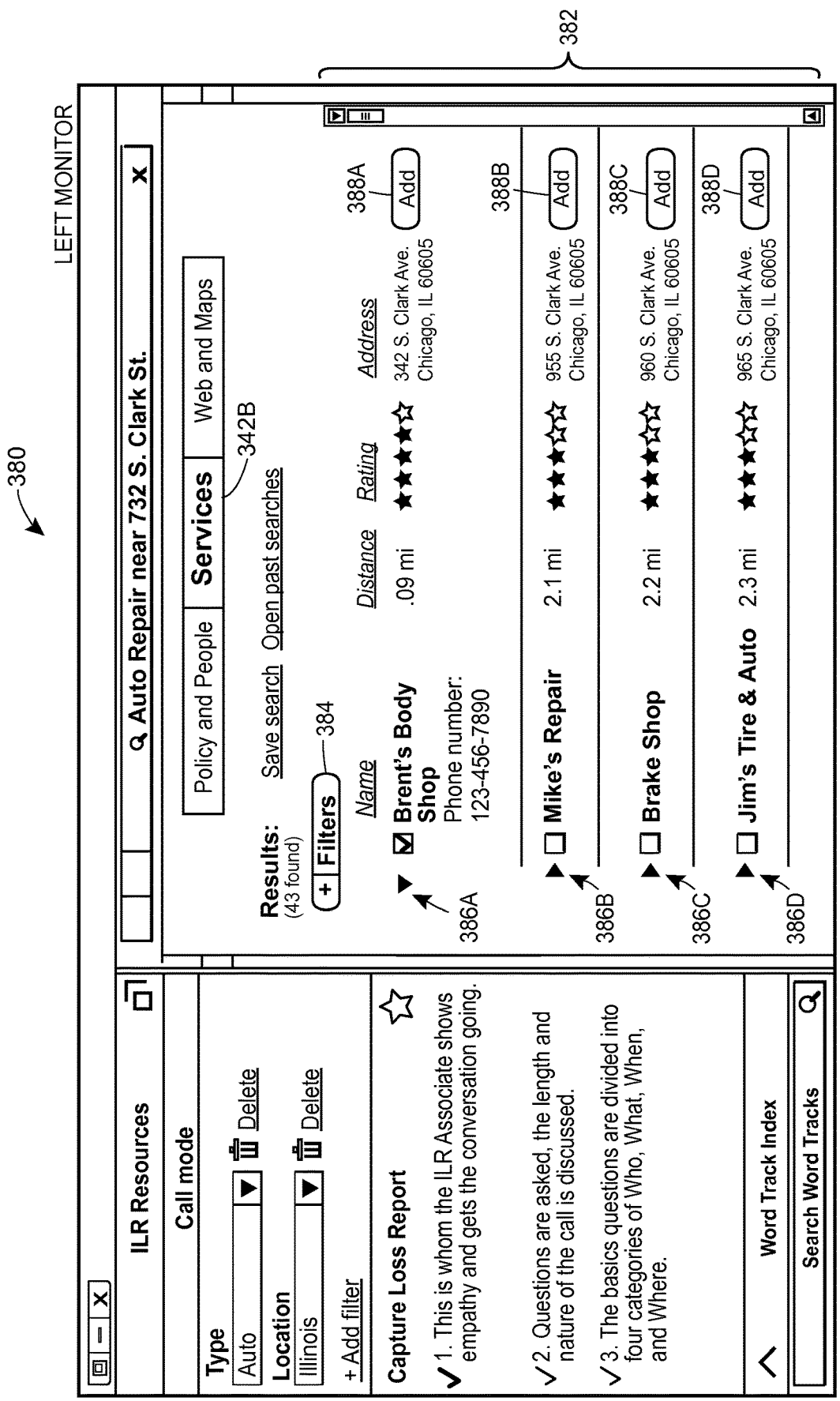
FIG. 14 depicts an exemplary user interface display that provides an integrated search tool, in a scenario in which a third search mode has been selected, according to one embodiment.
Figure 15:
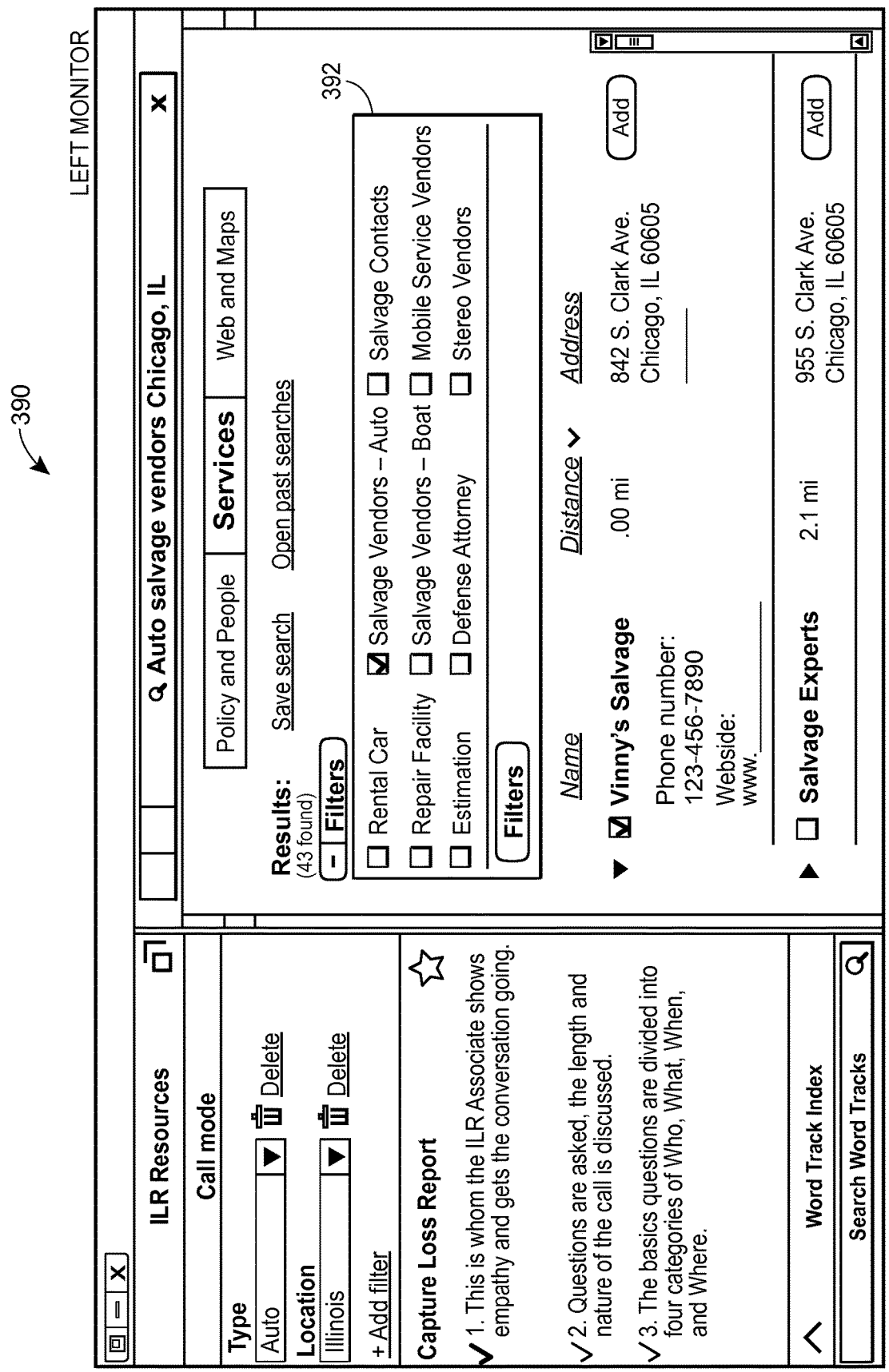
FIG. 15 depicts an exemplary user interface display, in a scenario where the filter control of the display in FIG. 14 has been expanded, according to one embodiment.

FIG. 14 shows an exemplary user interface display 380 that may be presented to the claim associate (e.g., on the left monitor screen) after the integrated search tool 144 has provided a result list 382 for a "Services" search. The results list 382 may appear when the claim associate has entered the caller's home address in the search field and selected the "Services" search mode using control 342B, for example. As seen in FIG. 14, if the "Services" search mode is used to search the home address of the caller, the results list 382 may include a list of entries 386 corresponding to service providers in the vicinity of the caller's home (e.g., provider name, provider address, distance of provider from the caller's home, etc.).

The workbench application 110 may also provide a filter control 384 that enables the claim associate to search for only a particular type of service provider. As seen in the example user interface display 390 of FIG. 15, for example, the claim associate may select one or more options provided by a control 392 to restrict the search results to only rental car companies, only repair facilities, only estimate companies, only salvage vendors (auto), only salvage vendors (boat), only defense attorneys, and so on.

Returning to FIG. 14, the workbench application 110 may also provide controls 388 that enable the claim associate to take particular actions for any given one of the search results/entries 386. For example, the claim associate may utilize the control 388A to add the services provider of entry 386A to an appropriate field of the claim record, or control 388B to add the services provider of entry 386B to an appropriate field of the claim record, etc.

As can be seen from the above discussion, the components in the environment 100, when using the above techniques, may drastically shorten the time required for a claim associate to complete a loss report and/or perform other claim-related activities. As such, the resource usage or consumption of the components in the environment 100 (e.g., in the computing system 104 and/or the client device 102) during the loss reporting process (or other claim-related process) may be greatly reduced. For example, the claim associate may need to locate and launch fewer applications, may need to make fewer duplicative entries and/or may need to initiate fewer independent searches, thereby causing the number of processor cycles utilized by the computing system 104 and/or the client device 102 to be greatly reduced. The number of queries to different databases may also be reduced, thereby reducing the number of network messages and/or increasing network efficiency.

Figure 16:
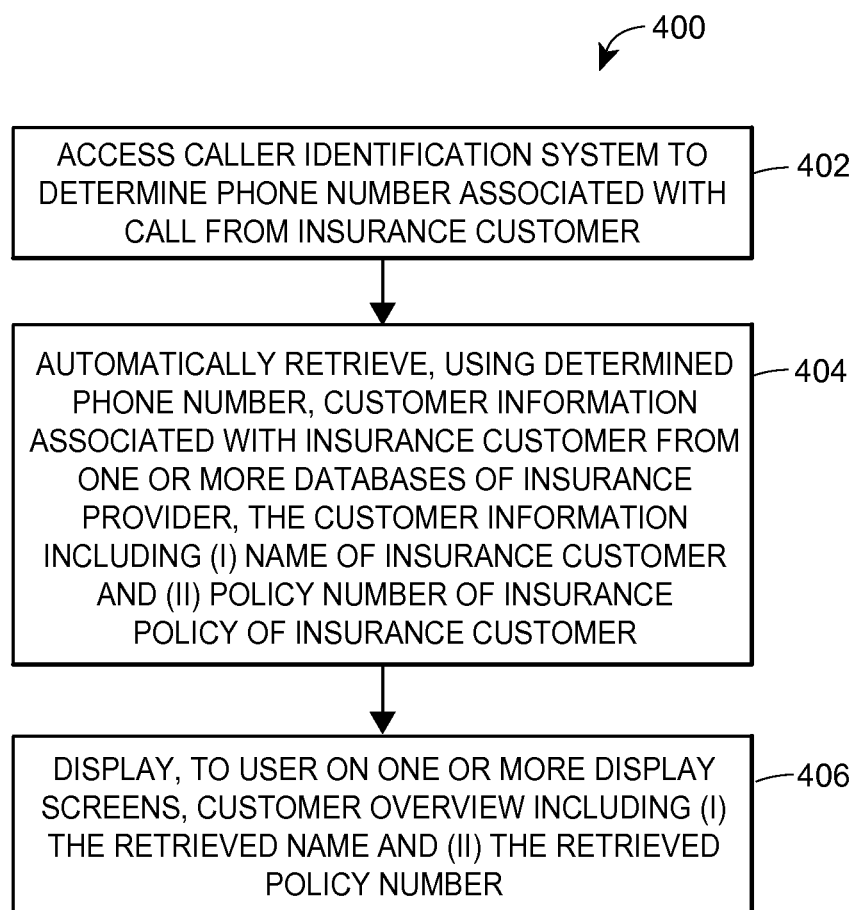
FIG. 16 depicts a flow diagram of an exemplary method for facilitating handling of a customer call using automated caller identification, according to one embodiment.

V. Exemplary Process Flow for Facilitating Call Handling Using Automated Caller Identification FIG. 16 depicts a flow diagram of an exemplary method 400 for facilitating the handling, by a user of a computing device having one or more display screens (e.g., one or more computer monitors), of a call from an insurance customer regarding a loss event, according to an embodiment. The method 400 may be implemented by a computing system (e.g., by one or more processors within a computing system), which may include the computing system 104 and/or the client device 102 of FIG. 2, for example.

In the example method 400, a caller identification system may be accessed to determine a phone number associated with a call from an insurance customer (block 402). With reference to FIG. 2, for example, one or more servers of the computing system 104 may interface with the insurance provider's telephone system, which may utilize a caller identification feature offered by the telephone service provider.

The phone number may be used to automatically retrieve customer information associated with the insurance customer from one or more databases of the insurance provider (block 404). With reference to FIG. 2, for example, one or more servers of the computing system 104 (e.g., the server(s) implementing block 402) may access one or more internal databases to locate customer information that is associated, in the insurance provider's records, with the caller's phone number. The retrieved customer information may include a name of the insurance customer, a policy number of an insurance policy of the customer, and/or other information relating to the customer/caller (e.g., claim history information regarding one or more claims associated with the customer, communication history information regarding one or more past communications involving the customer, family information regarding one or more family members of the customer, additional policy information regarding one or more other insurance policies of the customer, etc.).

The customer information may be retrieved from a single database, or from multiple databases. For example, a first portion of the customer information may be retrieved from a first database associated with a first insurance line (e.g., auto insurance), and a second portion of the customer information may be retrieved from a second database associated with a second insurance line (e.g., fire/home insurance).

A customer overview that includes the retrieved name, the retrieved policy number, and/or other retrieved customer information (e.g., claim history information, communication history information, family information, additional policy information, etc.) may be displayed to the user on the one or more display screens of the computing device (block 406). With reference to FIG. 2, for example, the client device 102 may display the retrieved customer information to the user of client device 102 (e.g., a claim associate) on output device 174.

In some embodiments, portions of the customer overview may be displayed to the user in response to the user opting to view that information (e.g., by clicking on a "+" symbol to expand a section of the customer overview, as for the claim history information seen in the example display 300 of FIG. 7). Moreover, the customer overview may be displayed in response to the user's computing device detecting a user confirmation. For example, block 406 may include displaying (on the display screen(s)) a request for user confirmation of the name and/or policy number (e.g., a "yes/no" confirmation of a single name and policy number, or a user selection from among a plurality of candidate names and policy numbers), and detecting the user's confirmation, prior to displaying the customer overview. Alternatively, the customer overview may be displayed without any user confirmation.

The customer overview may also provide, to the user, links to additional information, including information that was not necessarily retrieved at block 404. For example, the customer overview may include a user-selectable link to additional claim information for one or more claims associated with the insurance customer (e.g., similar to link 306A or 306B in FIG. 7), a user-selectable link to a user interface that enables modification of records data associated with the insurance customer (e.g., similar to link 286 in FIG. 6), and so on.

The method 400 may also include one or more blocks not shown in FIG. 16. For example, the method 400 may include an additional block in which at least a portion of the customer information retrieved at block 404 is used to automatically populate one or more fields that are provided by a loss reporting tool and displayed on the one or more display screens. As another example, if a name of a family member of the caller is retrieved at block 404, the customer overview displayed at block 406 may further include a user-interactive control that enables the user to select from various different relationships to the loss event. The method 400 may then include additional blocks in which the computing device detects a user selection, made via the user-interactive control, of a particular relationship from among the various different relationships, and in which information about the family member is used, along with the selected relationship, to automatically populate one or more fields that are provided by a loss reporting tool and displayed on the display screen(s).

Figure 17:
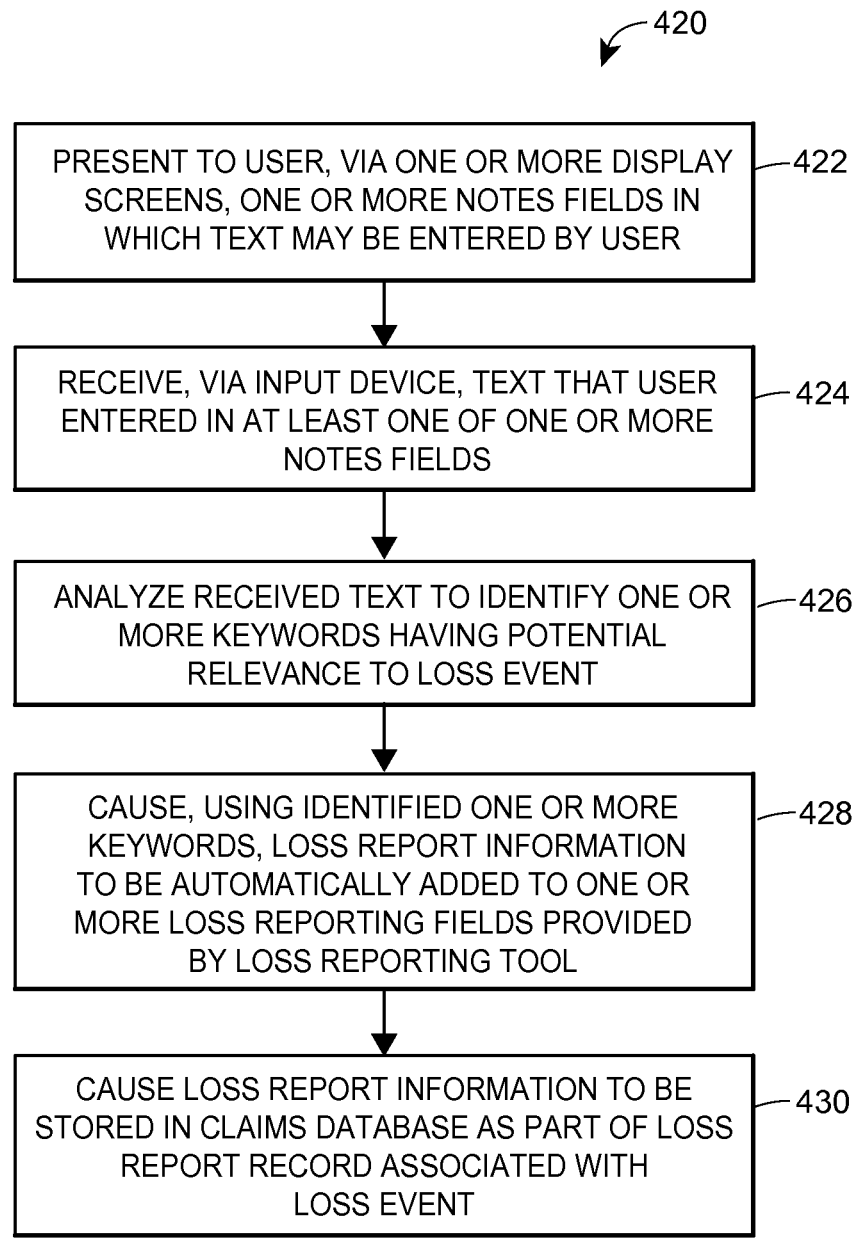
FIG. 17 depicts a flow diagram of an exemplary method for facilitating handling of a customer call using keyword recognition, according to one embodiment.

VI. Exemplary Process Flow for Facilitating Call Handling Using Keyword Recognition FIG. 17 depicts a flow diagram of another exemplary method 420 for facilitating handling, by a user of a computing device having one or more display screens (e.g., one or more computer monitors), of a call from an insurance customer regarding a loss event, according to an embodiment. The method 420 may be implemented by a computing system (e.g., by one or more processors within a computing system), which may include the computing system 104 and/or the client device 102 of FIG. 2, for example.

In the exemplary method 420, one or more notes fields in which the user may enter text are presented to the user via the display screen(s) (block 422). With reference to FIG. 2, for example, the client device 102 may present the notes field(s) to the user of client device 102 (e.g., a claim associate) on output device 174. In some embodiments, the notes field(s) may be presented along with other fields and/or displays. For example, a loss report user interface display showing at least one loss reporting field may be presented to the user (e.g. on a monitor screen different than a monitor screen showing the notes field(s)).

Text that the user entered in at least one of the one or more notes fields may be received via an input device (e.g., by the client device 102 of FIG. 2 via input device 172) (block 424). In some embodiments, other information may also be received. For example, the notes fields may include different note fields for different categories (e.g., "When," "Where," "What," "Who"), and an indication of the field/category in which the notes were entered may be received at block 424 in addition to the text.

The received text may be analyzed to identify one or more keywords having potential relevance to the loss event (block 426). With reference to FIG. 2, for example, one or more processors in a server of the computing system 104, or in the user's computing device (e.g., client device 102), may process the received text to identify the keyword(s). To provide just a few examples, the keyword(s) may include or describe a location (e.g., a street address or a street intersection), a time and/or date, a person's name, a make, model and/or year of a vehicle, and so on.

In some embodiments, the keyword(s) may be identified by comparing the received text to keywords stored in a keyword database (e.g., a keyword database stored at the user's computing device, or at a server remote from the user's computing device). Additionally, or alternatively, processing relating to the context in which various terms are used may be used to help identify keywords and/or the meaning of keywords. As just one example, sentence structure may be analyzed, in conjunction with the manner a term is used within that structure, to predict whether the term is a person's name or a name of a location (e.g., such that, for "X was in an accident on Belmont Ave," X is predicted to be a person's name, whereas for "Joe was in an accident on X," X is predicted to be a location name).

If an indication of a notes field/category was received at block 424, the received text may be analyzed according to rules corresponding to that specific notes field/category. For example, it may be determined that "June" is a person's name if the user had entered that text in a "Who" field, or a month if the user had entered that text in a "When" field. As another example, it may be determined that "Ford" is a person's name if the user had entered that text in a "Who" field, or a vehicle make if the user had entered that text in a "What" field.

The identified keyword(s) may be used to cause loss report information to be automatically added to one or more loss reporting fields provided by a loss reporting tool (e.g., loss reporting tool 114 of FIG. 2) (block 428). With reference to FIG. 2, for example, one or more processors in a server of the computing system 104, or in the user's computing device (e.g., client device 102), may cause the appropriate loss reporting field(s) to be populated accordingly. If a loss report user interface display is being presented to the user (e.g., as discussed above in connection with block 422), the loss report information may be shown/displayed within the corresponding fields of the loss report user interface display. Alternatively, the loss report information may be assigned to the appropriate loss report field(s), but not displayed to the user.

To provide just a few more specific examples, a time and/or date may be used to automatically populate one or more fields describing when the loss occurred (e.g., the "Date of Loss" and/or "Time of Loss" field(s) of FIGS. 9 and 10), a street address or intersection may be used to automatically populate a loss location field of the loss reporting tool, a vehicle make, model and/or year may be used to automatically populate a vehicle description field of the loss reporting tool, a person's name may be used to automatically populate an involved person field of the loss reporting tool, and so on. The keyword(s) may be transferred directly to the appropriate field(s), or may be entered in the field(s) in a modified format (e.g., changing "6/10/14" to "Jun. 10, 2014," etc.).

The loss report information may be caused to be stored in a claims database as a part of a loss report record associated with the loss event (block 430). With reference to FIG. 2, for example, the client device 102 may cause the loss report information to be stored in the claims database by sending a remote server (e.g., a server of computing system 104) the loss report information and/or an indication that the user has activated a user-interactive submit control (e.g., a virtual submit button) provided on the display screen(s).

Figure 18:
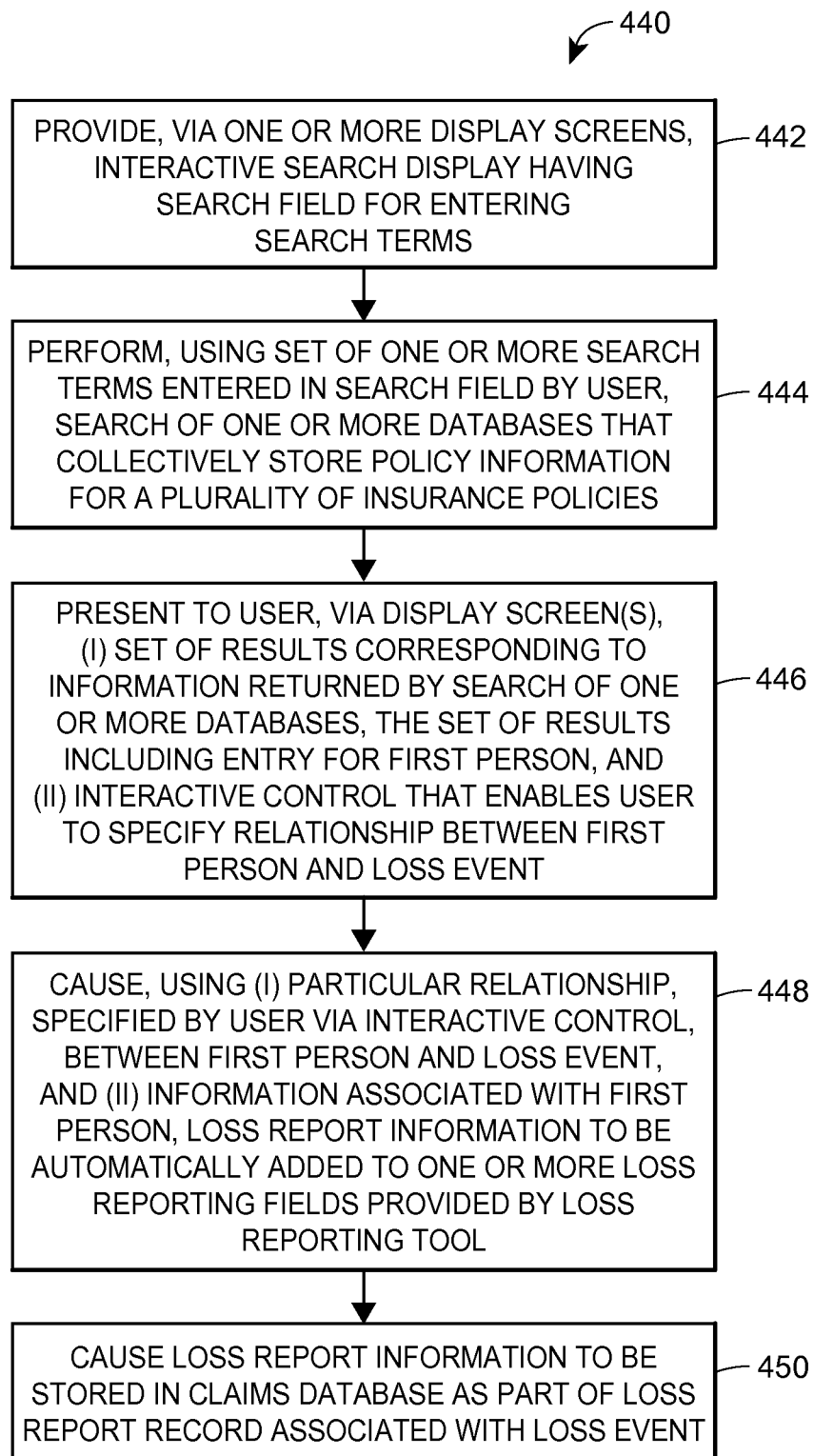
FIG. 18 depicts a flow diagram of still another exemplary method for facilitating handling of a customer call using an improved search tool, according to one embodiment.

VII. Exemplary Process Flow for Facilitating Call Handling Using an Improved Search Tool FIG. 18 depicts a flow diagram of yet another exemplary method 440 for facilitating handling, by a user of a computing device having one or more display screens, of a call from an insurance customer regarding a loss event, according to an embodiment. The method 440 may be implemented by a computing system (e.g., by one or more processors within a computing system), which may include the computing system 104 and/or the client device 102 of FIG. 2, for example.

In the example method 440, an interactive search display having a search field for entering search terms is provided via the display screen(s) (block 442). With reference to FIG. 2, for example, the client device 102 may provide the interactive search display to the user of client device 102 (e.g., a claim associate) on output device 174. The interactive search display may include one or more user-interactive mode controls for selecting a search mode from among multiple search modes. The different search modes may enable the user to search different sources and/or databases (e.g., an Internet search versus an internal database search), and/or may offer different features to the user (e.g., providing controls for filtering/restricting results according to criteria selected from a predetermined criteria list).

In some embodiments, the display screen(s) also present other information and/or user interfaces. For example, a loss report user interface display showing at least one loss reporting field may be presented to the user (e.g. on a monitor screen different than a monitor screen showing the interactive search display).

A set of one or more search terms, entered in the search field by the user, may be used to perform a search of one or more databases that collectively store policy information for a plurality of insurance policies (block 444). With reference to FIG. 2, for example, one or more servers within computing system 104 may perform a search of one or more databases (e.g., an auto insurance policy database and a fire/home insurance policy database both included in policy records 132). If a search mode was selected (by default or otherwise), the search of the database(s) may be in accordance with that search mode (e.g., the "People and Policy" search mode corresponding to the control 342A in FIG. 11).

A set of results, corresponding to information returned by the search of the database(s), and an interactive control may be presented to the user via the display screen(s) (e.g., by the client device 102 of FIG. 2 via output device 174) (block 446). The set of results may include one or more entries for one or more respective people, each of the people being associated with one or more of the insurance policies stored in the database(s). Each entry may include information such as a person's name, policy number, date of birth, home address, etc.

The interactive control may enable the user to specify a relationship between a particular person (corresponding to a particular entry) and the loss event. For example, the interactive control may enable the user to specify that the person in a particular entry is a reporting party, a policyholder, a driver in the loss event, and/or a participant in the loss event. The control may be similar to control 350A in FIG. 11, for example, or may have a different form and/or a different set of options. The control may enable selection of multiple relationships for a single person/entry, or may restrict the user to selecting only one relationship per person/entry. In various different embodiments, a different interactive control may be presented for each person/entry in the set of results, or a single interactive control may be used to indicate a relationship between the loss event and a person that has been selected by the user (e.g., by clicking on a check box or radio button next to the person's entry, etc.).

After the user specifies a particular relationship via the interactive control, information associated with the first person (e.g., information retrieved from policy records 132, claims records 134 and/or communication log 136) may be used in conjunction with the specified relationship to cause loss report information to be automatically added to one or more loss reporting fields provided by a loss reporting tool (e.g., loss reporting tool 114 of FIG. 2) (block 448). If the user indicated (via the interactive control) that "Linda Johnson" was a participant in the loss event, for example, an "Involved Person" field of the loss reporting tool may be populated with that name, and/or a field indicating a number of claimants may be incremented by one, etc.

With reference to FIG. 2, one or more processors in a server of the computing system 104, or in the user's computing device (e.g., client device 102), may cause the appropriate loss reporting field(s) to be populated. If a loss report user interface display is being presented to the user (e.g., as discussed above in connection with block 442), the loss report information may be shown/displayed within the corresponding fields of the loss report user interface display. Alternatively, the loss report information may be assigned to the appropriate loss report field(s), but not displayed to the user.

The loss report information may be caused to be stored in a claims database as a part of a loss report record associated with the loss event (block 450). With reference to FIG. 2, for example, the client device 102 may cause the loss report information to be stored in the claims database by sending a remote server (e.g., a server of computing system 104) the loss report information and/or an indication that the user has activated a user-interactive submit control (e.g., a virtual submit button) provided on the display screen(s).

The method 440 may also include one or more blocks not shown in FIG. 18. For example, the method 440 may include an additional block in which a selection of a different search mode, made by the user via the mode control(s), is detected (e.g., the "Webs and Maps" or "Services" search mode corresponding to the control 342B or 342C, respectively, in FIG. 11). A remote server may then be caused to perform a search using an additional set of one or more search terms and a third party, web-based search engine (e.g., by sending a search request to the remote server). An additional set of results corresponding to information returned by the third party search may then be presented to the user via the display screen(s), for example.

The different search mode may also provide other search features. If the search mode is a "Services" search mode, for example, the interactive search display may provide a filter control for restricting displayed search results to one or more particular types of services (e.g., salvage vendors, body shops, etc.).

Figure 19:
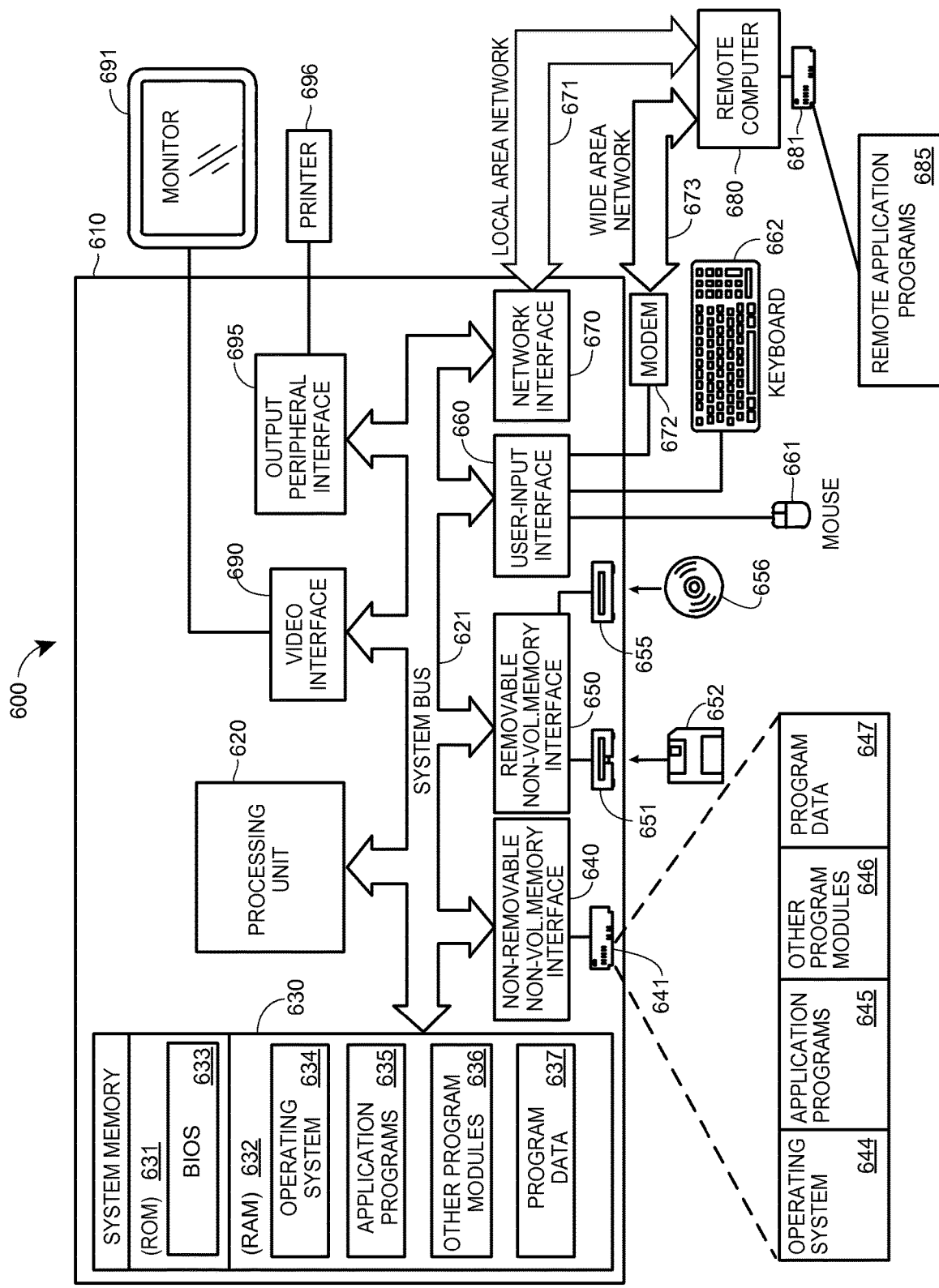
FIG. 19 depicts an exemplary computer system in which the techniques described herein may be implemented, according to one embodiment.

VIII. Exemplary Computer System for the Provision, Operation and/or Use of an Integrated Tool for Improved Workflow Efficiency FIG. 19 depicts an exemplary computer system 600 in which the any of the techniques described herein may be implemented, according to one embodiment. The computer system 600 of FIG. 19 may include a computing device in the form of a computer 610. Components of the computer 610 may include, but are not limited to, a processing unit 620, a system memory 630, and/or a system bus 621 that couples various system components including the system memory 630 to the processing unit 620.

The system bus 621 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 610 typically may include a variety of computer-readable media. Computer-readable media may be any available media that can be accessed by computer 610 and may include both volatile and nonvolatile media, and both removable and non-removable media. By way of example, and not limitation, computer-readable media may comprise computer storage media and communication media.

Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 630 may include computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, may be typically stored in ROM 631. RAM 632 typically contains data and/or program modules that are immediately accessible to, and/or presently being operated on, by processing unit 620. By way of example, and not limitation, FIG. 19 illustrates operating system 634, application programs 635, other program modules 636, and program data 637.

The computer 610 may also include other removable/non-removable, volatile/nonvolatile computer storage media. By way of example only, FIG. 19 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The hard disk drive 641 may be connected to the system bus 621 through a non-removable memory interface such as interface 640, and magnetic disk drive 651 and optical disk drive 655 may be connected to the system bus 621 by a removable memory interface, such as interface 650.

The drives and their associated computer storage media discussed above and illustrated in FIG. 19 provide storage of computer-readable instructions, data structures, program modules and other data for the computer 610. In FIG. 19, for example, hard disk drive 641 is illustrated as storing operating system 644, application programs 645, other program modules 646, and program data 647. Note that these components may either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter commands and information into the computer 610 through input devices, such as cursor control device 661 (e.g., a mouse, trackball, touch pad, etc.) and keyboard 662. A monitor 691 or other type of display device is also connected to the system bus 621 via an interface, such as a video interface 690. In addition to the monitor, computers may also include other peripheral output devices such as printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically may include many or all of the elements described above relative to the computer 610, although only a memory storage device 681 has been illustrated in FIG. 19. The logical connections depicted in FIG. 19 include a local area network (LAN) 671 and a wide area network (WAN) 673, but may also include other networks. Such networking environments are commonplace in hospitals, offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the input interface 660, or other appropriate mechanism. The communications connections 670, 672, which allow the device to communicate with other devices, are an example of communication media, as discussed above. In a networked environment, program modules depicted relative to the computer 610, or portions thereof, may be stored in the remote memory storage device 681. By way of example, and not limitation, FIG. 19 illustrates remote application programs 685 as residing on memory device 681.

The techniques for the provision, operation and/or use of an integrated tool for improved workflow efficiency described above may be implemented in part or in their entirety within a computer system such as the computer system 600 illustrated in FIG. 19. The computer 610 may be a computing device of a claim associate (e.g., client device 102 of FIG. 2), and the remote computer 680 may be a server of an insurance provider (e.g., within the computing system 104 of FIG. 2), for example. In some such embodiments, the LAN 671 or WAN 673 may be omitted (e.g., communications may between computer 610 and computer 680 may only occur via WAN 673, or only via LAN 671). Application programs 645 may include a web browser application such as web browser application 170 of FIG. 2, for example. In operation, the claim associate may use computer 610 to access a workbench application (e.g., similar to the workbench application 12 of FIG. 1 and/or the workbench application 110 of FIG. 2) stored at computer 680 and/or at computer 610, and the associate may view the user interface(s) of the workbench application via monitor 691 (and possibly one or more additional monitors similar to monitor 691), and may provide inputs via keyboard 662 and/or mouse 661, for example.

VII. Exemplary Method Embodiments

In one aspect, a computer-implemented method for facilitating handling, by a user of a computing device having one or more display screens, of a call from an insurance customer regarding a loss event may include (1) accessing, by one or more servers, a caller identification system to determine a phone number associated with the call from the insurance customer. The method may also include (2) automatically retrieving, by the one or more servers and using the determined phone number, customer information associated with the insurance customer from one or more databases of an insurance provider, the customer information including (i) a name of the insurance customer and/or (ii) a policy number of an insurance policy of the insurance customer. The method may also include (3) displaying, to the user on the one or more display screens, a customer overview including (i) the retrieved name and/or (ii) the retrieved policy number. The method may include additional, fewer or alternative actions, such as any of those discussed elsewhere herein.

For instance, displaying the customer overview may include displaying, on the one or more display screens, a request for user confirmation of one or both of (i) the retrieved name, and (ii) the retrieved policy number, detecting, at the computing device, confirmation by the user of one or both of (i) the retrieved name, and (ii) the retrieved policy number, and in response to detecting the confirmation by the user, displaying the customer overview on the one or more display screens.

Additionally or alternatively, the method may include using at least a portion of the retrieved customer information to automatically populate one or more fields that are provided by a loss reporting tool and displayed on the one or more display screens.

Additionally or alternatively, automatically retrieving customer information associated with the insurance customer may include automatically retrieving (i) the name of the insurance customer, (ii) the policy number of an insurance policy of the insurance customer, and/or (iii) claim history information regarding one or more claims associated with the insurance customer, and/or displaying a customer overview may include displaying a customer overview including (i) the retrieved name, (ii) the retrieved policy number, and/or (iii) at least a portion of the retrieved claim history information.

Additionally or alternatively, automatically retrieving customer information associated with the insurance customer may include automatically retrieving (i) the name of the insurance customer, (ii) the policy number of an insurance policy of the insurance customer, and/or (iii) communication history information regarding one or more past communications involving the insurance customer, and/or displaying a customer overview may include displaying a customer overview including (i) the retrieved name, (ii) the retrieved policy number, and/or (iii) at least a portion of the retrieved communication history information.

Additionally or alternatively, automatically retrieving customer information associated with the insurance customer may include automatically retrieving (i) the name of the insurance customer, (ii) the policy number of an insurance policy of the insurance customer, and/or (iii) family information regarding one or more family members of the insurance customer, and/or displaying a customer overview may include displaying a customer overview including (i) the retrieved name, (ii) the retrieved policy number, and/or (iii) at least a portion of the retrieved family information.

Additionally or alternatively, displaying a customer overview may include displaying a customer overview including (i) a name of a first family member, and/or (ii) a user-interactive control that enables the user to select from a plurality of relationships to the loss event. The method may further include detecting, by the computing device, a user selection via the user-interactive control of a particular relationship from among the plurality of relationships, and using (i) information about the first family member, and/or (ii) the particular relationship, to automatically populate one or more fields that are provided by a loss reporting tool and displayed on the one or more display screens.

Additionally or alternatively, automatically retrieving customer information associated with the insurance customer may include automatically retrieving (i) the name of the insurance customer, (ii) the policy number of an insurance policy of the insurance customer, and/or (iii) additional policy information regarding one or more other insurance policies of the insurance customer, and/or displaying a customer overview may include displaying a customer overview including (i) the retrieved name, (ii) the retrieved policy number, and/or (iii) at least a portion of the retrieved additional policy information.

Additionally or alternatively, displaying the customer overview may further include providing, on the one or more display screens, a user-selectable link to additional claim information for one or more claims associated with the insurance customer.

Additionally or alternatively, displaying the customer overview may further include providing, on the one or more display screens, a user-selectable link to a user interface that enables modification of records data associated with the insurance customer.

Additionally or alternatively, automatically retrieving customer information associated with the insurance customer may include automatically retrieving (i) a first portion of the customer information from a first database associated with a first insurance line, and/or (ii) a second portion of the customer information from a second database associated with a second insurance line.

In another aspect, a computer-implemented method for facilitating handling, by a user of a computing device having one or more display screens and an input device, of a call from an insurance customer regarding a loss event may include (1) presenting to the user, by the computing device and via the one or more display screens, one or more notes fields in which text may be entered by the user; (2) receiving, by the computing device and via the input device, text that the user entered in at least one of the one or more notes fields; (3) analyzing, by one or more processors, the received text to identify one or more keywords having potential relevance to the loss event; (4) causing, by the one or more processors and using the identified one or more keywords, loss report information to be automatically added to one or more loss reporting fields provided by a loss reporting tool; and/or (5) causing, by the computing device, the loss report information to be stored in a claims database as a part of a loss report record associated with the loss event. The method may include additional, fewer or alternative actions, such as any of those discussed elsewhere herein.

For instance, analyzing the received text to identify one or more keywords may include analyzing the received text to identify one or more words describing a location, and causing loss report information to be automatically added to one or more loss reporting fields may include causing a description of the location to be added to a loss location field provided by the loss reporting tool.

Additionally or alternatively, analyzing the received text to identify one or more keywords may include analyzing the received text to identify a name of a person, and/or causing loss report information to be automatically added to one or more loss reporting fields may include causing the name to be added to an involved person field provided by the loss reporting tool.

Additionally or alternatively, analyzing the received text to identify one or more keywords may include analyzing the received text to identify a one or more of (i) a make of a vehicle, (ii) a model of the vehicle, and/or (iii) a year of the vehicle, and/or causing loss report information to be automatically added to one or more loss reporting fields may include causing one or more of (i) the make of the vehicle, (ii) the model of the vehicle, and/or (iii) the year of the vehicle to be added to one or more involved vehicle fields provided by the loss reporting tool.

Additionally or alternatively, analyzing the received text to identify one or more keywords may include comparing the received text to a plurality of keywords stored in a keyword database.

Additionally or alternatively, receiving text that the user entered in the at least one notes field further may include receiving an indication of a first notes category, among a plurality of notes categories, in which the text was entered, and/or analyzing the received text to identify one or more keywords may include analyzing the received text according to rules corresponding to the first notes category.

Additionally or alternatively, causing the loss report information to be stored in the claims database may be in response to the user submitting the loss report via a user-interactive submit control presented on the one or more display screens, and/or may include sending the loss report information to a server remote from the computing device.

Additionally or alternatively, one or both of (i) analyzing the received text to identify the one or more keywords, and (ii) causing the loss report information to be automatically added to the one or more loss reporting fields, may be by one or more processors of the computing device, or by one or more processors of one or more servers that are remote from the computing device.

Additionally or alternatively, presenting the one or more notes fields may further include presenting to the user, via the one or more display screens, a loss report user interface display showing at least one of the one or more loss reporting fields, and/or causing the loss report information to be automatically added to the one or more loss reporting fields may include causing the loss report user interface display to show the loss report information in the at least one of the one or more loss reporting fields.

In another aspect, a computer-implemented method for facilitating handling, by a user of a computing device having one or more display screens, of a call from an insurance customer regarding a loss event may include (1) providing, by the computing device and via the one or more display screens, an interactive search display having a search field for entering search terms; (2) performing, by one or more servers and using a set of one or more search terms entered in the search field by the user, a search of one or more databases that collectively store policy information for a plurality of insurance policies; (3) presenting to the user, by the computing device and via the one or more display screens, (i) a set of results corresponding to information returned by the search of the one or more databases, the set of results including an entry for a first person associated with at least one of the plurality of insurance policies, and/or (ii) an interactive control that enables the user to specify a relationship between the first person and the loss event; (4) causing, by one or more processors and using (i) a particular relationship, specified by the user via the interactive control, between the first person and the loss event, and/or (ii) information associated with the first person, loss report information to be automatically added to one or more loss reporting fields provided by a loss reporting tool; and/or (5) causing, by the computing device, the loss report information to be stored in a claims database as a part of a loss report record associated with the loss event. The method may include additional, fewer or alternative actions, such as any of those discussed elsewhere herein.

For instance, providing an interactive search display may include providing an interactive search display having one or more user-interactive mode controls for selecting a search mode from among a plurality of search modes. The method may further comprise, prior to performing the search of the one or more databases, detecting a selection, made by the user via the one or more user-interactive mode controls, of a first search mode of the plurality of search modes.

Additionally or alternatively, the method may further comprise (a) detecting a selection, made by the user via the one or more user-interactive mode controls, of a second search mode of the plurality of search modes; (b) causing, by the one or more processors and using an additional set of one or more search terms entered in the search field by the user, a remote server to perform a search using a third party, web-based search engine; and/or (c) presenting to the user, by the computing device and via the one or more display screens, an additional set of results corresponding to information returned by the search using the third party, web-based search engine.

Additionally or alternatively, detecting a selection of a second search mode of the plurality of search modes may include detecting a selection of a services search, and/or providing an interactive search display having one or more user-interactive mode controls for selecting a search mode may further include providing an interactive search display having a filter control for restricting displayed search results to one or more particular types of services.

Additionally or alternatively, performing a search of one or more databases may include performing a search of a first database storing auto insurance policy information and/or a second database storing home insurance policy information.

Additionally or alternatively, presenting a set of results corresponding to information returned by the search of the one or more databases may include presenting an entry for the first person that includes (i) a name of the first person, and/or (ii) a policy number of a policy associated with the first person.

Additionally or alternatively, presenting an interactive control that enables the user to specify a relationship between the first person and the loss event may include presenting an interactive control that enables the user to select from among a plurality of relationships, the plurality of relationships including (i) a driver during the loss event, (ii) a participant in the loss event, and/or (iii) a party reporting the loss event.

Additionally or alternatively, causing the loss report information to be stored in the claims database may be in response to the user submitting the loss report via a user-interactive submit control presented on the one or more display screens, and/or may include sending the loss report information to a server remote from the computing device.

Additionally or alternatively, causing the loss report information to be automatically added to the one or more loss reporting fields may be by one or more processors of the computing device, or may be by one or more processors of one or more servers that are remote from the computing device.

Additionally or alternatively, the method may further comprise presenting to the user, by the computing device and via the one or more display screens, a loss report user interface display showing at least one of the one or more loss reporting fields, and/or causing the loss report information to be automatically added to the one or more loss reporting fields may include causing the loss report user interface display to show the loss report information in the at least one of the one or more loss reporting fields.

VIII. Exemplary Computing Device Embodiments

In one aspect, a computing system for facilitating handling of insurance-related calls may include one or more databases collectively storing policy and policyholder records of an insurance provider, one or more processors, and a non-transitory memory. The memory may store instructions that, when executed by the one or more processors, cause the one or more processors to access a caller identification system to determine a phone number associated with a call (i) from an insurance customer, and/or (ii) handled by a user of a computing device. The instructions may also cause the processor(s) to automatically retrieve, using the determined phone number, customer information associated with the insurance customer from the one or more databases. The customer information may include (i) a name of the insurance customer, and/or (ii) a policy number of an insurance policy of the insurance customer. The instructions may also cause the processor(s) to display, on the one or more display screens, a customer overview including (i) the retrieved name, and/or (ii) the retrieved policy number. The computing system may include additional, fewer or alternative components, and/or components with additional, less or alternative functionality, such as any of the components and/or functionality discussed elsewhere herein.

For instance, the instructions may cause the one or more processors to display the customer overview by displaying, on the one or more display screens, a request for user confirmation of one or both of (i) the retrieved name, and (ii) the retrieved policy number, detecting confirmation by the user of one or both of (i) the retrieved name, and (ii) the retrieved policy number, and/or in response to detecting the confirmation by the user, displaying the customer overview on the one or more display screens.

Additionally or alternatively, the instructions may further cause the one or more processors to use at least a portion of the retrieved customer information to automatically populate one or more fields that are provided by a loss reporting tool and displayed on the one or more display screens.

Additionally or alternatively, the customer information may include (i) the name of the insurance customer, (ii) the policy number of an insurance policy of the insurance customer, and/or (iii) claim history information regarding one or more claims associated with the insurance customer, and/or the customer overview may include (i) the retrieved name, (ii) the retrieved policy number, and/or (iii) at least a portion of the retrieved claim history information.

Additionally or alternatively, the customer information may include (i) the name of the insurance customer, (ii) the policy number of an insurance policy of the insurance customer, and/or (iii) communication history information regarding one or more past communications involving the insurance customer, and/or the customer overview may include (i) the retrieved name, (ii) the retrieved policy number, and/or (iii) at least a portion of the retrieved communication history information.

Additionally or alternatively, the customer information may include (i) the name of the insurance customer, (ii) the policy number of an insurance policy of the insurance customer, and/or (iii) family information regarding one or more family members of the insurance customer, and/or the customer overview may include (i) the retrieved name, (ii) the retrieved policy number, and/or (iii) at least a portion of the retrieved family information.

Additionally or alternatively, the customer overview may include (i) a name of a first family member, and/or (ii) a user-interactive control that enables the user to select from a plurality of relationships to the loss event, and/or the instructions may further cause the one or more processors to detect a user selection via the user-interactive control of a particular relationship from among the plurality of relationships, and/or use (i) information about the first family member, and/or (ii) the particular relationship, to automatically populate one or more fields that are provided by a loss reporting tool and displayed on the one or more display screens.

Additionally or alternatively, the customer information may include (i) the name of the insurance customer, (ii) the policy number of an insurance policy of the insurance customer, and/or (iii) additional policy information regarding one or more other insurance policies of the insurance customer, and/or the customer overview may include (i) the retrieved name, (ii) the retrieved policy number, and/or (iii) at least a portion of the retrieved additional policy information.

Additionally or alternatively, the one or more databases may include a first database associated with a first insurance line and a second database associated with a second insurance line, and/or the instructions may cause the one or more processors to automatically retrieve (i) a first portion of the customer information from the first database, and/or (ii) a second portion of the customer information from the second database.

In another aspect, a computing system for facilitating handling of insurance-related calls may include a claims database storing information for a plurality of insurance claims, and a computing device comprising one or more display screens and an input device. The computing device may be configured to present to the user, via the one or more display screens, one or more notes fields in which text may be entered by a user of the computing device, and receive, via the input device, text that the user entered in at least one of the one or more notes fields. The computing system may also include one or more processors, and a non-transitory memory. The memory may store instructions that, when executed by the one or more processors, cause the one or more processors to analyze the text received via the input device to identify one or more keywords having potential relevance to the loss event, and use the identified one or more keywords to cause loss report information to be automatically added to one or more loss reporting fields provided by a loss reporting tool. The computing device may be further configured to cause the loss report information to be stored in the claims database as a part of a loss report record associated with the loss event. The computing system may include additional, fewer, or alternative components, and/or components with additional, less or alternative functionality, such as any of the components and/or functionality discussed elsewhere herein.

For instance, the one or more keywords may include one or more words describing a location, the one or more loss reporting fields may include a loss location field, and the instructions may cause the one or more processors to use the identified one or more keywords to cause a description of the location to be automatically added to the loss location field.

Additionally or alternatively, the one or more keywords may include a name of a person, the one or more loss reporting fields may include an involved person field, and the instructions may cause the one or more processors to use the identified one or more keywords to cause the name of the person to be automatically added to the involved person field.

Additionally or alternatively, the one or more keywords may include one or more of (i) a make of a vehicle, (ii) a model of the vehicle, and/or (iii) a year of the vehicle, the one or more loss reporting fields may include one or more involved vehicle fields. The instructions may cause the one or more processors to use the identified one or more keywords to cause one or more of (i) the make of the vehicle, (ii) the model of the vehicle, and/or (iii) the year of the vehicle to be automatically added to the involved vehicle field.

Additionally or alternatively, the computing system may include a keyword database storing a plurality of keywords, and/or the instructions may cause the one or more processors to identify the one or more keywords at least by comparing the received text to the plurality of keywords stored in the keyword database.

Additionally or alternatively, the instructions may further cause the one or more processors to receive an indication of a first notes category, among a plurality of notes categories, in which the text was entered, and the instructions may cause the one or more processors to analyze the received text to identify the one or more keywords at least by analyzing the received text according to rules corresponding to the first notes category.

Additionally or alternatively, the instructions may cause the one or more processors to cause the loss report information to be stored in the claims database in response to the user submitting the loss report via a user-interactive submit control presented on the one or more display screens, and at least by sending the loss report information added to the one or more loss reporting fields to a server remote from the computing device.

Additionally or alternatively, the computing device, and/or one or more servers remote from the computing device, may include the one or more processors.

Additionally or alternatively, the computing device may further be configured to present to the user, via the one or more display screens, a loss report user interface display showing at least one of the one or more loss reporting fields. The instructions may cause the one or more processors to cause the loss report information to be automatically added to the one or more loss reporting fields at least by causing the loss report user interface display to show the loss report information in the at least one of the one or more loss reporting fields.

In another aspect, a computing system for facilitating handling of insurance-related calls may include a claims database storing information for a plurality of insurance claims, one or more databases collectively storing information about a plurality of policies and a plurality of policyholders, and a computing device comprising one or more display screens. The computing device may be configured to provide, via the one or more display screens, an interactive search display having a search field for entering search terms. The computing system may also include one or more servers configured to use a set of one or more search terms entered in the search field by a user of the computing device to perform a search of the one or more databases, one or more processors, and a non-transitory memory storing instructions. The computing device may further be configured to present to the user, via the one or more display screens, (i) a set of results corresponding to information returned by the search of the one or more databases, the set of results including an entry for a first person associated with at least one of the plurality of insurance policies, and/or (ii) a user-interactive control that enables the user to specify a relationship between the first person and the loss event. The instructions, when executed by the one or more processors, may cause the one or more processors to use (i) a particular relationship, specified by the user via the user-interactive control, between the first person and the loss event, and/or (ii) information associated with the first person, to cause loss report information to be automatically added to one or more loss reporting fields provided by a loss reporting tool. The computing device may further be configured to cause the loss report information to be stored in the claims database as a part of a loss report record associated with the loss event. The computing system may include additional, fewer or alternative components, and/or components with additional, less or alternative functionality, such as any of the components and/or functionality discussed elsewhere herein.

For instance, the interactive search display may further include one or more user-interactive mode controls for selecting a search mode from among a plurality of search modes, at least one of the plurality of search modes causing a remote server to perform a search using a third party, web-based search engine.

Additionally or alternatively, the one or more databases may include a first database storing auto insurance policy information and a second database storing home insurance policy information.

Additionally or alternatively, the set of results corresponding to information returned by the search of the one or more databases may include an entry for the first person that includes (i) a name of the first person and (ii) a policy number of a policy associated with the first person.

Additionally or alternatively, the user-interactive control that enables the user to specify a relationship between the first person and the loss event may enable the user to select from among a plurality of relationships, the plurality of relationships including (i) a driver during the loss event, (ii) a participant in the loss event, and/or (iii) a party reporting the loss event.

Additionally or alternatively, the computing device may be configured to cause the loss report information to be stored in the claims database in response to the user submitting the loss report via a user-interactive submit control presented on the one or more display screens, and/or at least by sending the loss report information to a server remote from the computing device.

Additionally or alternatively, the computing device may include the one or more processors or the servers may include the one or more processors.

Additionally or alternatively, the computing device may further be configured to present to the user, via the one or more display screens, a loss report user interface display showing at least one of the one or more loss reporting fields, and/or the instructions, when executed by the one or more processors, may further cause the one or more processors to cause the loss report user interface display to show the loss report information in the at least one of the one or more loss reporting fields.

IX. Exemplary Customer Overview and Workbench

In one aspect, the present embodiments relate to insurance providers, customer service, and handling insurance claims. A system and method may provide an easy to use interface that will locate commonly used applications into a single user interface for insurance claim associates. Each item linked to the product may either be opened at startup and be ready for the associates' use, or available as a shortcut in an integrated tool area. The associate will not need to seek out each application, open, and then position it on the monitor screen(s) while preparing for the day's business.

"Customer Overview" functionality may be provided that will help claim associates do the following: (1) quickly gain familiarity with the customer and his or her most recent contacts with the insurance provider; (2) provide an "at a glance" view of the information associated with, and/or communicated to, the customer—information about the customer, policies, agent(s), family members, recent phone/email interactions with the insurance provider, and claim history (for claim segment representatives)—when a customer calls in and his or her account is accessed; and/or (3) quickly view and access insurance policy information for the customer. Information displayed in the Customer Overview may be linkable to the actual content.

Tool integration may also be provided. Many applications may be integrated within a so-called "Workbench" and its components to work together. For instance, search functionality may be integrated with various applications. Several search options may be provided via a single interface and may result in integration with other applications. Data and user interface integration may also be provided. Multiple sources/applications may be used to collect customer data and present a streamlined display in one consolidated location. A smart notepad may also be integrated with the present embodiments. The smart notepad may be configured to recognize data typed into a text editor application, and to categorize it for direct entry into a companion program. For example: "Ford" would be recognized as a vehicle make for entry into a vehicle make field.

In one aspect, a workbench, virtual hub, and/or graphical user interface may be provided that displays information or visual representations based upon caller ID (identification) or telephone number of incoming calls. One or more processors may determine the caller ID or telephone number associated with an incoming call, such as a call coming into a customer call center. After which, the one or more processors may search a customer database to automatically pull up and/or access customer information and/or customer insurance policy information (that corresponds to that caller ID and/or telephone number associated with the incoming call).

The present embodiments may use the incoming telephone number as a key that triggers other activity, such as displaying information (e.g., customer information, location, insurance policy information) associated with the incoming telephone number. As a result, the incoming telephone number may be used to (1) automate certain processes, such as launching various software applications, such as loss reporting or claim handling applications for insurance purposes; and/or (2) reduce redundancy, such as transferring customers to various internal call representatives, agents, or associates, and having each insurance provider representative ask the customer for their information (name, address, location, telephone number, etc.).

A text editor portion of the virtual hub or graphical user interface may be configured to recognize certain keywords, such as address, location, streets, city, states, telephone numbers, person names, insured names, etc., and then pre-populate certain fields of the virtual hub or graphical user interface with correct (customer and/or insurance policy) information. As such, a call representative may take a call and speak with a customer. Certain customer information (or likely customer information) and/or insurance policy information for that customer may be immediately presented on the screen based upon caller ID or telephone number.

As the insurance representative or associate talks with a customer (e.g., gathers information associated with a vehicle accident or other insurance claim), the associate may type a summary of the discussion into a text editor box. The present embodiments may then include searching the text editor box for various keywords and pre-populating certain fields of a virtual claims or loss reporting page/screen to facilitate prompt and automated claim submission. In other words, as the associate is documenting or capturing loss information provided by the customer, the notepad may be tagging keywords and placing them in relevant fields, such as location, vehicle make and model, number of injuries, extent of vehicle damage, details about the accident, etc.

In one aspect, a computer-implemented method of presenting insurance-related information on a display may be provided. The method may include (1) determining, via one or more processors, a caller ID or telephone number of an incoming customer call; (2) retrieving, via the one or more processors, customer information (or likely customer information) and/or insurance policy information for that customer from a memory unit, data structure, or database (or from several dispersed memory units or databases) based upon or otherwise using the caller ID or telephone number of the incoming customer call; and/or (3) displaying or updating a virtual text or graphical representation, via the one or more processors, within a virtual hub or user interface on a display or display screen that includes the customer information (or likely customer information) and/or insurance policy information to facilitate a call representative or associate handling a call from a customer without having to ask the customer or likely customer for rudimentary customer information (e.g., name, address, location, telephone number, etc.). The virtual hub or user interface may include a text pad or editor functionality that allows the call representative or associate to enter text associated with the customer call. The method may further include (4) receiving, via the one or more processors, call representative or associate entry of text associated with a customer call, such as text associated with an insurance claim or issue; (5) analyzing the text, via the one or more processors, for keywords associated with insurance or the customer; (6) updating, via the one or more processors, the virtual hub or user interface (and/or one or more pages/screens or applications) based upon the keywords identified, such as pre-populating certain user interface or virtual insurance claim fields; and/or (7) storing, via the one or more processors, the updated virtual hub or user interface, and/or keyword(s) or associated customer information, in a memory unit, data structure, or database for subsequent use by other and/or remotely located call representatives or associates to facilitate avoiding asking the customer the same question or questions more than once. The method may include additional, fewer, or alternate actions, including those discussed elsewhere herein.

The virtual hub (or workbench) and/or user interface may present a summary of customer information, insurance policy information, and/or claim information. Also displayed within the virtual hub or user interface may be an interaction history that may include a history of interactions with the customer, such as whether the customer has talked with an insurance agent, call representative, or associate about a claim, whether the customer has filed a claim, whether the customer has a claim pending, etc.

The virtual hub and/or user interface (and/or associated processors) may also analyze text from the text editor or notepad to determine a location, such as a current customer or vehicle location or a location of an accident. The location may be used to display a virtual map. For the virtual map, the call representative or associate may view a type of intersection, for example, at which a vehicle accident occurred, which may help the call representative or associate (or a loss reporting specialist) handle a claim associated with the vehicle accident. The map may be used to find local body shops or repair facilities in the vicinity of the current location of a damaged vehicle. The call representative or associate may direct the customer a nearest body shop, in one embodiment, for vehicle repair, and/or make arrangements with the nearest body shop to repair the vehicle.

Some embodiments may have automatic or manual electronic searching functionality. For instance, customer address or current customer or vehicle location may be used for initial searches and/or for subsequent searches. The address or location information may be used to present a map of local body shops. The address or location information may also be passed from one application to another. For instance, the address or location information may be used to search for weather events in the area that may impact the customer or vehicle, as well as for potential catastrophic events, such as hurricanes, that may also negatively impact the customer or vehicle.

X. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the provision, operation and/or use of an integrated tool for improved workflow efficiency through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for presenting a customer overview user interface (UI) configured for use, by a user of a computing device having one or more display screens, during a call from an insurance customer regarding a loss event, the method comprising:
   determining, by one or more processors executing a workbench application, a phone number associated with a call from an insurance customer, wherein determining the phone number includes accessing a caller identification system via a first application programming interface (API) of the workbench application;
   automatically retrieving, by the one or more processors executing the workbench application and using the determined phone number, customer information associated with the insurance customer from one or more databases of an insurance provider including:
      (i) retrieving, from a first database via a second API of the workbench application for a first application linked with the workbench application, a name of the insurance customer, and
      (ii) retrieving, from a second database via a third API of the workbench application for a second application linked with the workbench application, a policy number of an insurance policy of the insurance customer; and
   automatically presenting, to the user on the one or more display screens of the computing device, the customer overview UI pre-populated on behalf of the user including:
      (i) presenting the retrieved name in a first area of the customer overview UI, and
      (ii) presenting the retrieved policy number in a second area of the customer overview UI to facilitate enhanced handling of the call by the user,
   wherein the workbench application integrates the customer overview UI and a short-cut area into a single UI within a display screen of the computing device, and presents the single UI to the user so that the user may not need to separately seek out each application, open each application, and position the window(s) corresponding to each application on the display screen.

2. The computer-implemented method of claim 1, wherein displaying the customer overview UI further includes:
   presenting a request for user confirmation of one or both of (i) the retrieved name, and (ii) the retrieved policy number in a third area of the customer overview UI;
   detecting, at the computing device, confirmation by the user of one or both of (i) the retrieved name, and (ii) the retrieved policy number; and
   in response to detecting the confirmation by the user, presenting the customer overview UI on the one or more display screens.

3. The computer-implemented method of claim 1, further comprising:
   using at least a portion of the retrieved customer information to automatically populate one or more fields of the customer overview UI that are provided by a loss reporting tool via a fourth API of the workbench application for the loss reporting tool for presentation in a third area of the customer overview UI.

4. The computer-implemented method of claim 1, further comprising:
   automatically retrieving claim history information from a third database via a fourth API of the workbench application for a third application linked with the workbench application, the retrieved claim history information regarding one or more claims associated with the insurance customer; and
   presenting at least a portion of the retrieved claim history information in a third area of the customer overview UI.

5. The computer-implemented method of claim 1, further comprising:
   automatically retrieving communication history information associated with the insurance customer from a third database via a fourth API of the workbench application for a third application linked with the workbench application, the retrieved communication history information regarding one or more past communications involving the insurance customer; and
   presenting at least a portion of the retrieved communication history information in a third area of the customer overview UI.

6. The computer-implemented method of claim 1, further comprising:
   automatically retrieving family information from a third database via a fourth API of the workbench application for a third application linked with the workbench application, the retrieved family information regarding one or more family members of the insurance customer; and
   presenting at least a portion of the retrieved family information in a third area of the customer overview UI.

7. The computer-implemented method of claim 6, wherein:
   presenting in the customer overview UI the at least a portion of the retrieved family information includes presenting (i) a name of a first family member, and (ii) a user-interactive control that enables the user to select from a plurality of relationships to the loss event; and the method further comprises
   detecting, by the computing device, a user selection via the user-interactive control of a particular relationship from among the plurality of relationships, and using (i) information about the first family member, and (ii) the particular relationship, to automatically populate one or more fields of the customer overview UI that are provided via a fourth API by a loss reporting tool linked with the workbench application and presented in a fourth area of the customer interface UI.

8. The computer-implemented method of claim 1, further comprising:
   automatically retrieving additional policy information associated with the insurance customer, from a third database via a fourth API of the workbench application for a third application linked with the workbench application, the retrieved additional policy information regarding one or more other insurance policies of the insurance customer; and
   presenting at least a portion of the retrieved additional policy information in a third area of the customer overview UI.

9. The computer-implemented method of claim 1, wherein presenting the customer overview UI further includes providing, on the one or more display screens, a user-selectable link to additional claim information for one or more claims associated with the insurance customer.

10. The computer-implemented method of claim 1, wherein displaying the customer overview UI further includes providing, on the one or more display screens, a user-selectable link to a records data UI configured to enable modification of records data associated with the insurance customer.

11. The computer-implemented method of claim 1, wherein
   automatically retrieving customer information associated with the insurance customer includes automatically retrieving (i) a first portion of the customer information from a third database associated with a first insurance line, and (ii) a second portion of the customer information from a fourth database associated with a second insurance line.

12. A computing system for pre-populating and displaying a customer overview user interface (UI) to a user of the computing device during a call from an insurance customer regarding a loss event, the computing system comprising:
   one or more databases collectively storing policy and policyholder records of an insurance provider;
   one or more processors; and
   a non-transitory memory storing instructions of a workbench application that, when executed by the one or more processors, cause the one or more processors to:
   determine a phone number associated with a call (i) from an insurance customer and (ii) handled by a user of a computing device, at least by accessing a caller identification system via a first application programming interface (API) of the workbench application, automatically retrieve, using the determined phone number, customer information associated with the insurance customer from the one or more databases, at least by accessing the one or more databases via respective ones of one or more APIs, the one or more APIs associated with respective ones of one or more applications linked with the workbench application, and
   automatically display, on the one or more display screens of the computing device, a customer overview UI pre-populated on behalf of the user, wherein displaying the customer overview UI includes (i) displaying the retrieved name pre-populated in a first area of the customer overview UI and (ii) displaying the retrieved policy number to facilitate insurance claim handling pre-populated in a second area of the customer overview UI, wherein the workbench application integrates the customer overview UI and a short-cut area into a single UI within a display screen of the computing device and presents the single UI to the user so that the user may not need to separately seek out each application, open each application, and position the window(s) corresponding to each application on the display screen.

13. The computing system of claim 12, wherein the instructions further cause the one or more processors to display the customer overview UI by:

displaying, in a third area of the customer overview UI on the one or more display screens, a request for user confirmation of one or both of (i) the retrieved name, and (ii) the retrieved policy number;

detecting confirmation by the user of one or both of (i) the retrieved name, and (ii) the retrieved policy number; and in response to detecting the confirmation by the user, displaying a fourth area of the customer overview UI on the one or more display screens.

14. The computing system of claim 12, wherein the instructions further cause the one or more processors to:

use at least a portion of the retrieved customer information to automatically populate one or more fields of the customer overview UI that are provided by a loss reporting tool linked with the workbench application.

15. The computing system of claim 12, wherein:

the customer information includes (i) the name of the insurance customer, (ii) the policy number of an insurance policy of the insurance customer, and (iii) claim history information regarding one or more claims associated with the insurance customer; and the customer overview UI includes (i) the retrieved name, (ii) the retrieved policy number, and (iii) at least a portion of the retrieved claim history information.

16. The computing system of claim 12, wherein:

the customer information includes (i) the name of the insurance customer, (ii) the policy number of an insurance policy of the insurance customer, and (iii) communication history information regarding one or more past communications involving the insurance customer; and the customer overview UI includes (i) the retrieved name, (ii) the retrieved policy number, and (iii) at least a portion of the retrieved communication history information.

17. The computing system of claim 12, wherein:

the customer information includes (i) the name of the insurance customer, (ii) the policy number of an insurance policy of the insurance customer, and (iii) family information regarding one or more family members of the insurance customer; and the customer overview UI includes (i) the retrieved name, (ii) the retrieved policy number, and (iii) at least a portion of the retrieved family information.

18. The computing system of claim 17, wherein:

the customer overview UI includes (i) a name of a first family member, and (ii) a user-interactive control that enables the user to select from a plurality of relationships for the first family member to the loss event; and the instructions further cause the one or more processors to detect a user selection via the user-interactive control of a particular relationship from among the plurality of relationships, and use (i) information about the first family member, and (ii) the particular relationship, to automatically populate one or more fields of the customer overview UI that are provided by a loss reporting tool linked with the workbench application.

19. The computing system of claim 12, wherein:

the customer information includes (i) the name of the insurance customer, (ii) the policy number of an insurance policy of the insurance customer, and (iii) additional policy information regarding one or more other insurance policies of the insurance customer; and the customer overview UI includes (i) the retrieved name, (ii) the retrieved policy number, and (iii) at least a portion of the retrieved additional policy information.

20. The method of claim 1, further comprising:

receiving during the call, via the one or more processors from a representative, text related to the loss event;

analyzing the text, via the one or more processors, to identify keywords associated with insurance or the insurance customer; and automatically retrieving claim data from a third database via a fourth API of the workbench application for a claim system application linked with the workbench application; and pre-populating, via the one or more processors, at least one of pre-populating customer a field of the customer overview UI, or an area of the customer overview UI with the claim data.

21. The method of claim 1, wherein the first API, the second API, and the third API are a same API.

22. The method of claim 1, wherein the first API, the second API, and the third API are different APIs.

* * * * *